United States Patent
Lee et al.

(10) Patent No.: US 12,067,474 B2
(45) Date of Patent: Aug. 20, 2024

(54) CO-INFORMATIC GENERATIVE ADVERSARIAL NETWORKS FOR EFFICIENT DATA CO-CLUSTERING

(71) Applicant: Samsung Electronics Company, Ltd., Gyeonggi-do (KR)

(72) Inventors: Hyun Chul Lee, Mountain View, CA (US); Jaejun Lee, Toronto (CA); Tomasz Jan Palczewski, Danville, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 869 days.

(21) Appl. No.: 17/031,575

(22) Filed: Sep. 24, 2020

(65) Prior Publication Data
US 2021/0097372 A1 Apr. 1, 2021

Related U.S. Application Data

(60) Provisional application No. 62/908,769, filed on Oct. 1, 2019.

(51) Int. Cl.
*G06N 3/045* (2023.01)
*G06N 3/088* (2023.01)

(52) U.S. Cl.
CPC ............ *G06N 3/045* (2023.01); *G06N 3/088* (2013.01)

(58) Field of Classification Search
CPC ... G06F 16/906; G06F 16/9536; G06N 3/045; G06N 3/047; G06N 3/084; G06N 3/088
See application file for complete search history.

(56) References Cited

U.S. PATENT DOCUMENTS

| | | |
|---|---|---|
| 2018/0121823 A1 | 5/2018 | Bauer |
| 2019/0197358 A1 | 6/2019 | Madani |
| 2019/0205334 A1* | 7/2019 | Kim ..................... G06T 1/0007 |

FOREIGN PATENT DOCUMENTS

CN 107832353 A 3/2018

OTHER PUBLICATIONS

Banerjee et al., "A Generalized Maximum Entropy Approach to Bregman Co-clustering and Matrix Approximation", Aug. 2007, Journal of Machine Learning Research 8 (2007), pp. 1919-1986. (Year: 2007).*

(Continued)

*Primary Examiner* — Brent Johnston Hoover

(57) ABSTRACT

A method implemented by one or more computing systems includes accessing a first data matrix including a plurality of row data and a plurality of column data. The method further includes providing, to a first generative adversarial network (GAN), a first data input including a plurality of row vectors corresponding to the plurality of row data, and providing, to a second GAN, a second data input including a plurality of column vectors corresponding to the plurality of column data. The method further includes generating, by simultaneous co-clustering the plurality of row vectors and the plurality of column vectors by the first GAN and the second GAN, a co-clustered correlation matrix based on the plurality of row vectors and the plurality of column vectors. The method further includes the co-clustered correlation matrix includes co-clustered associations between the plurality of row data and the plurality of column data.

20 Claims, 26 Drawing Sheets

(56) References Cited

OTHER PUBLICATIONS

Supplementary European Search Report in in EP 20 87 0637, Jun. 29, 2022.
Hanhuai Shan et al., "Bayesian Co-clustering", 2008 Eighth IEEE International Conference on Data Mining, IEEE, Dec. 15, 2008.
Perera, Dilruk et al., "CnGAN: Generative Adversarial Networks for Cross-network user preference generation for non-overlapped users", The World Wide Web Conference, ACM, May 13, 2019.
International Search Report and Written Opinion for International Application No. PCT/KR2020/013357, Jan. 15, 2021.
Arindam Banerjee et al., 'A Generalized Maximum Entropy Approach to Bregman Co-clustering and Matrix Approximation', Journal of Machine Learning Research, vol. 8, pp. 1919-1986, 2007, pp. 1921-1922, 1952-1953, 1961, Aug. 2007.
Yang Yu et al., 'Mixture of GANs for Clustering', Proceedings of the Twenty-Seventh International Joint Conference on Artificial Intelligence (IJCAI-18), pp. 3047-3053, Jul. 19, 2018, p. 3049; and figure 1, Jul. 19, 2018.
Chen, Xi, Yan Duan, Rein Houthooft, John Schulman, Ilya Sutskever, and Pieter Abbeel. "Infogan: Interpretable representation learning by information maximizing generative adversarial nets." In Advances in neural information processing systems, pp. 2172-2180, 2016.
Xu, Rui, and Donald Wunsch. "Survey of clustering algorithms." IEEE Transactions on neural networks 16, No. 3: pp. 645-678, May 1, 2005.
Xu, Dongkuan, and Yingjie Tian. "A comprehensive survey of clustering algorithms." Annals of Data Science 2, No. 2: pp. 165-193, Aug. 12, 2015.
Madeira, Sara C., and Arlindo L. Oliveira. "Biclustering algorithms for biological data analysis: a survey." IEEE/ACM transactions on computational biology and bioinformatics 1, No. 1: pp. 24-45, Aug. 2004.
Cheng, Yizong, and George M. Church. "Biclustering of expression data." In Ismb, vol. 8, No. 2000, pp. 93-103, 2000.
Kluger, Yuval, Ronen Basri, Joseph T. Chang, and Mark Gerstein. "Spectral biclustering of microarray data: coclustering genes and conditions." Genome research 13, No. 4: pp. 703-716, Jan. 28, 2003.
George, Thomas, and Srujana Merugu. "A scalable collaborative filtering framework based on co-clustering." In Fifth IEEE International Conference on Data Mining (ICDM'05), 8 pages, 2005.
Deodhar, Meghana, and Joydeep Ghosh. "SCOAL: A framework for simultaneous co-clustering and learning from complex data." ACM Transactions on Knowledge Discovery from Data (TKDD) 4, No. 3: pp. 1-31, Sep. 10, 2010.
Dhillon, Inderjit S., and Dharmendra S. Modha. "Concept decompositions for large sparse text data using clustering." Machine learning 42, No. 1-2: pp. 143-175, 2001.
Dhillon, Inderjit S., Subramanyam Mallela, and Dharmendra S. Modha. "Information-theoretic co-clustering." In Proceedings of the ninth ACM SIGKDD international conference on Knowledge discovery and data mining, pp. 89-98, 2003.
Govaert, Gérard, and Mohamed Nadif. Co-clustering: models, algorithms and applications. John Wiley & Sons, pp. 1-53, 2013.
Min, Erxue, Xifeng Guo, Qiang Liu, Gen Zhang, Jianjing Cui, and Jun Long. "A survey of clustering with deep learning: From the perspective of network architecture." *IEEE Access* 6 (2018): pp. 39501-39514, Jul. 17, 2018.
Donahue, Jeff, Philipp Krähenbühl, and Trevor Darrell. "Adversarial feature learning." *arXiv preprint arXiv:1605.09782*. 18 pages, 2016.
Mukherjee, Sudipto, Himanshu Asnani, Eugene Lin, and Sreeram Kannan. "Clustergan: Latent space clustering in generative adversarial networks." In *Proceedings of the AAAI Conference on Artificial Intelligence*, vol. 33, pp. 4610-4617, 2019.
Communication pursuant to Article 94(3) EPC (Examination Report) from the European Patent Office in Application No. 20 870 637.4-1203, May 19, 2023.
Summons to Attend Oral Proceedings from the European Patent Office in Application No. 20 870 637.4—1203.

* cited by examiner

| | K-Pop | K-Drama | Anime | E-Sports | Soccer | Car Race |
|---|---|---|---|---|---|---|
| 1 time | | | | | | |
| 2 times | | | | | User 4 | User 6 |
| 5 times | | | User 3 | | | |
| 8 times | | User 1 | | | | |
| 9 times | User 5 | | | | | |
| 12 times | | | | User 2 | | |

*FIG. 3A*

$X_r$ = [0,1,1,0,1,1,0,0,1,0,1,1,1,0,1, ...] ← Now consider one single real data sample

— 300I

The table below shows values of generated "fake" data samples ($x_r$).

| BB= | [0,0,0,1] | [0,0,1,0]B | [0,1,0,0]B | [1,0,0,0] |
|---|---|---|---|---|
| $Zr = 0$ | [0,1,0,0,1,0,0,1,1,0,1, ...] | | | |
| 1 | | | | |
| 0 | | | | |
| 0 | | | | |
| ... | | | | |

(This "fake" $x_r$ value is generated based on Zr, Cr, d, and weights and biases of NN. For example, to start, the elements of vector Zr, the Cr value, and the d value can be multiplied by the weights in NN to generate this "fake" $x_r$.)

For example, approximately 7 million parameters may be applied (e.g., multiplied and/or other mathematical operations) to Zr, Cr, and d to result in $x_r$.

Cr = [0,0,0,1]

d = [0,0,1,0,0,0,0,0,0,0,0,0,0,0,0,0]

| 0 | 0 | 0 | 0 |
|---|---|---|---|
| 0 | 0 | 1 | 0 |
| 0 | 0 | 0 | 0 |
| 0 | 0 | 0 | 0 |

Zr1 = [0]; Zr2 = [1]; Zr3 = [0]; Zr4 = [0]; Zr5 = [1]; ... Zrn = [0].
(For example: There can be thousands of Zr values. Zr can be a vector of 0's and 1's and can have hundreds of elements.)
Zr = [0,1,0,0,1,...,0]

Now consider one single real data sample $X_r$ = [0,1,1,0,1,1,0,0,1,0,1,1,1,0,1, ...]

The table below shows values of generated "fake" data samples ($x_f$).
(In this example: This table is for one Cr value [0,0,0,1] and one d value [0,0,1,0,0,0,0,0,0,0,0,0]. There are 3 more columns for the 3 other Cr values. Also, there are 11 more tables for the 11 other d values.)

| Cr = | [0,0,0,1] | [0,0,1,0]; | [0,1,0,0]; | [1,0,0,0] |
|---|---|---|---|---|
| $Z_f = 0$ | [0,1,0,1,0,0,1,1,1,0,1, ...] | | | |
| 1 | [1,1,0,1,0,0,0,1,0,1,1,0,0,1, ...] | | | |
| 0 | [0,1,1,0,1,1,0,0,1,0,1,1,0, ...] | | | |
| 0 | [0,1,0,1,0,1,0,1,0,0,1,1,0,0,1, ...] | | | |
| ... | | | | |

Forward Propagation and Back Propagation for one instance of $x_r$ $X_r = [0,1,1,0,1,1,0,0,1,0,1,1,1,0,1,...]$ ← Consider one single real data sample The table below shows values of generated "fake" data samples ($x_f$).
(This table is for one Cr value [0,0,0,1] and one d value [0,0,1,0,0,0,0,0,0,0,0]. There are 3 more columns for the 3 other Cr values. Also, there are 11 more tables for the 11 other d values.)

| BB= | [0,0,0,1] | [0,0,1,0]B | [0,1,0,0]B | [1,0,0,0] |
|---|---|---|---|---|
| BB = 0 | [0,1,0,0,1,0,0,1,1,0,1,1,1,0,1, ...] | | | |
| 1 | [1,1,0,1,0,0,0,1,0,1,1,1,0,0,1, ...] | | | |
| 0 | [0,1,1,0,1,1,0,0,1,0,1,0,1,1,0, ...] | | | |
| 0 | [0,1,0,1,0,1,0,1,0,0,1,1,0,0,1, ...] | | | |
| ••• | | | | |

Forward Propagation and Back Propagation is to:
1) Try to make $X_r$ similar to $x_r$
2) Try to maximize mutual information

*FIG. 3K*

Forward propagation through neural network (NN).
This NN below is implemented in Gr.

$X_r = [0,1,1,0,1,1,0,0,1,0,1,1,0,1,...]$ ← Consider one single real data sample Input layer $i$ Hidden layers $h_1$ $h_2$ $h_n$ Output layer $o$ One input
$(Zr1 \sim Zm + Cr1 + d1)$ $Zr1 \sim Zm + Cr1 + d1 = [0,1,0,0,1,...,0] + [0,0,0,1] + [0,0,1,0,0,0,0,0,0,0]$
$= [0,1,0,0,1,...,0,0,0,0,1,0,0,1,0,0,0,0,0,0,0]$ One output:
One instance of $x_r$
$[0,0,1,0,1,1,0,0,1,0,1,1,0,0,1,...]$

*FIG. 3L*

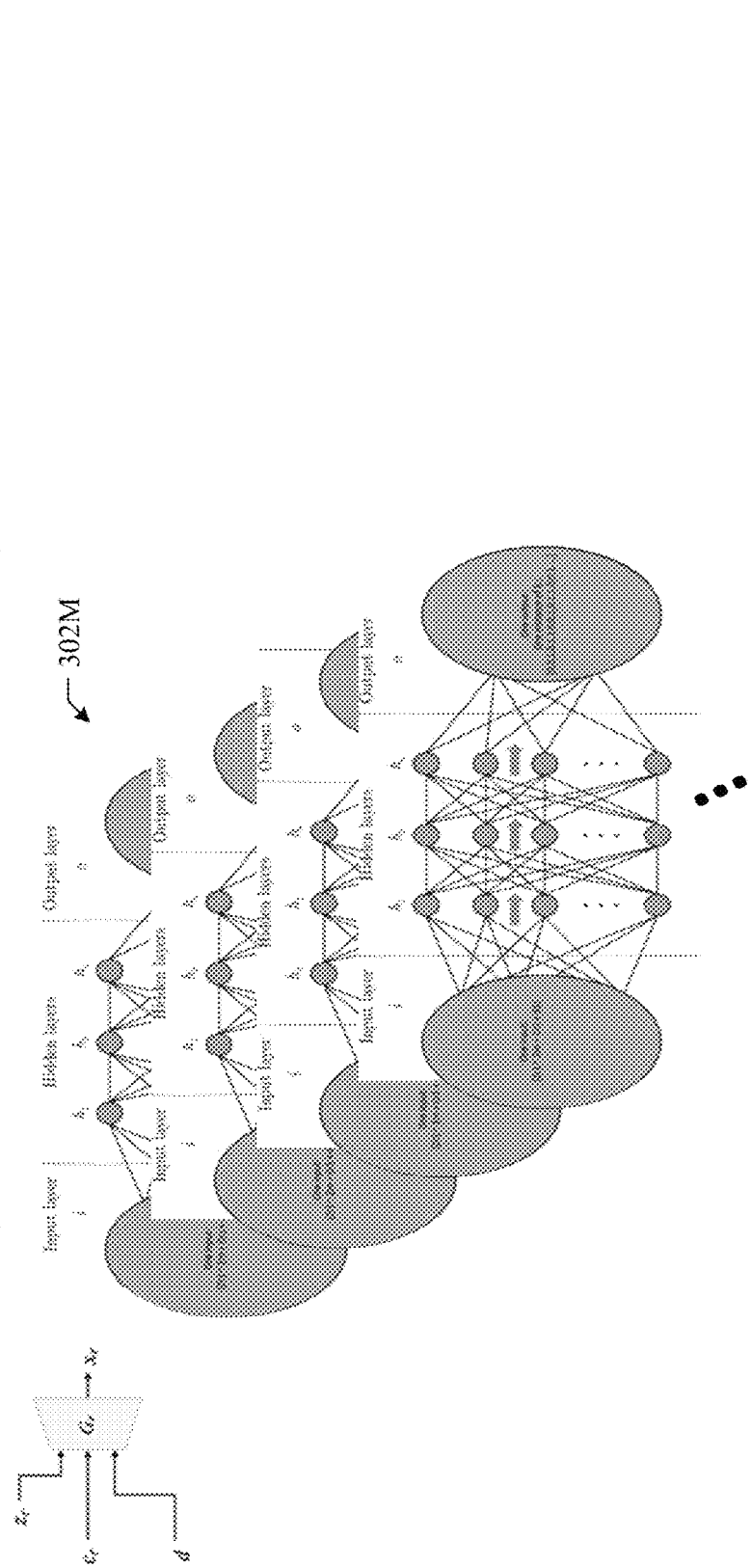

Discriminator $D_r$ determines whether $x_r$ is sufficiently similar to $X_r$ (True or False). If $x_r$ and $X_r$ are sufficiently similar (e.g., True), then training is complete (i.e., convergence) for the one single real data sample $X_r = [0,1,1,0,1,1,0,0,1,0,1,1,1,0,1, ...]$. When training for everything is complete, then the reconstructed latent codes (C'r, C'c, and d') are also generated.

CO-INFORMATIC GENERATIVE ADVERSARIAL NETWORKS FOR EFFICIENT DATA CO-CLUSTERING

PRIORITY

This application claims the benefit under 35 U.S.C. § 119(e) of U.S. Provisional Patent Application No. 62/908,769, filed 1 Oct. 2019, which is incorporated herein by reference.

TECHNICAL FIELD

This disclosure relates generally to data co-clustering, and, more particularly, to co-informatic generative adversarial networks (CI-GANs) for efficient data co-clustering.

BACKGROUND

Recommendation systems typically include applications that facilitate users in locating items of interest for consumption, often in a quasi-personalized manner. A certain type of recommendation system may include a television (TV) recommendation system, which may be utilized to provide recommendations, for example, for certain movies, TV series, news programs, sporting telecasts, and so forth that a particular user(s) may be interested in viewing. Additionally, with the plethora of programming genres, programming channels, video-sharing platform publisher channels, and other features increasingly available to users, deep learning techniques may be applied in recommendation systems to improve user viewing recommendations. Particularly, while traditional recommendation systems may be suitable for modeling, for example, sequential and structured TV programming data, the actual TV programming viewing habits of users may, in many instances, include non-sequential and/or unstructured data (e.g., due to users viewing preferences varying or evolving over time). It may be useful to provide one or more data co-clustering techniques to improve recommendation systems.

DESCRIPTION OF EXAMPLE EMBODIMENTS

Figure 1:
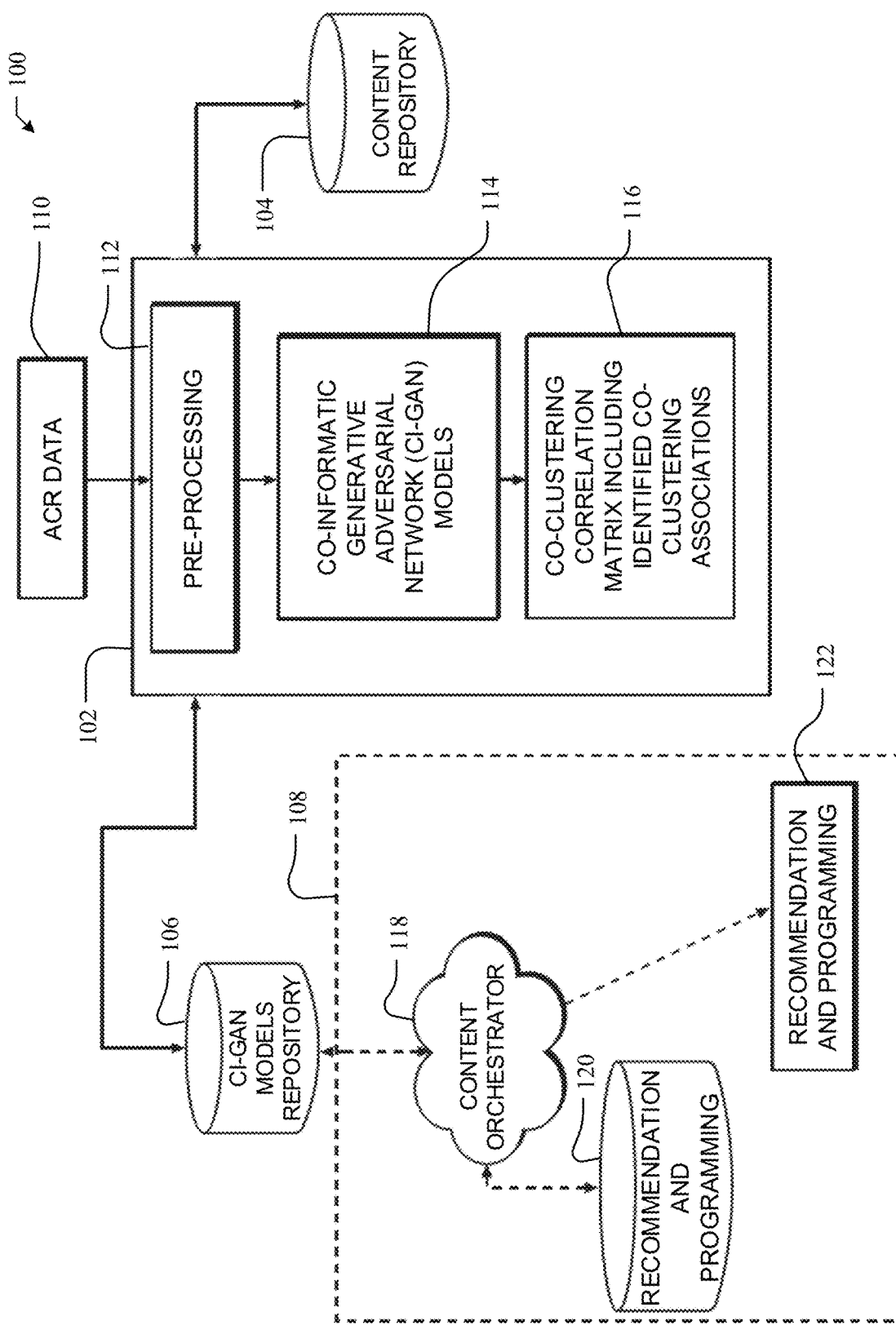
FIG. 1 illustrates an example co-informatic generative adversarial network (CI-GAN) co-clustering system.

The present embodiments are directed toward providing a co-informatic generative adversarial network (CI-GAN) for efficient data co-clustering, in accordance with the presently disclosed embodiments. In particular embodiments, the CI-GAN model may access a first data matrix including a plurality of row data and a plurality of column data. In particular embodiments, the CI-GAN model may receive a data matrix of data, which may include, for example, user behavioral data as the plurality of row data and user content viewing data as the plurality of column data, video data as the plurality of row data and video-caption data as the plurality of column data, biological genetic data as the plurality of row data and biological condition data as the plurality of column data, movie data as the plurality of row data and music data as the plurality of column data, or image data as the plurality of row data and audible data as the plurality of column data. It should be understood that at least some dimensions (e.g., rows and columns) are interchangeable.

In particular embodiments, the CI-GAN model may receive, to a first GAN (e.g., a first InfoGAN), a first data input including a plurality of row vectors corresponding to the plurality of row data from the first data matrix. In particular embodiments, the CI-GAN model may also receive, to a second GAN, a second data input including a plurality of column vectors corresponding to the plurality of column data from the first data matrix. In particular embodiments, the first GAN and the second GAN may be part of a CI-GAN combiner model architecture, in which the CI-GAN combiner model architecture may further include a distribution function configured to reconstruct one or more co-cluster labels provided to the first GAN and the second GAN as a third data input. In particular embodiments, in conjunction or in the alternative, the first GAN and the second GAN may be part of a CI-GAN autoencoder model architecture, in which the CI-GAN autoencoder model architecture may further include a distribution function configured to reconstruct the plurality of row data and the plurality of column data based on a plurality of output row data generated by the first GAN and a plurality of output column data generated by the second GAN.

Indeed, the present embodiments may provide a CI-GAN model for efficient data co-clustering. Specifically, as the data clustering of row data and column data are achieved independently by a first GAN (e.g., a first InfoGAN) and a second GAN (e.g., a second InfoGAN) of the CI-GAN model, the CI-GAN model may thus allow the maximization of the mutual information (e.g., I indicating a measurement of how much one random variable may suggest about another random variable) between the input row data and column data and the co-cluster associations in several disparate manners. In this way, the present CI-GAN model for efficient data co-clustering, as further augmented with a mutual information objective function, may be well suited for collectively learning dual data representations across various technical applications. While the present embodiments may be discussed below primarily with respect to TV programming and recommendation systems, it should be appreciated that the present techniques may be applied to any of various systems or applications that may utilize 2D data, such as TV programming and recommendation systems, genomic data analysis, medical systems and analyses, GPS systems, indoor localization and tracking systems, search engine systems, text document and web-page search systems, oil and gas exploration and refinement systems, database search systems, and/or other applications and systems that may utilize multidimensional data.

An example co-informatic generative adversarial network (CI-GAN) co-clustering system 100 is illustrated by FIG. 1.

As depicted by FIG. 1, the CI-GAN system 100 may include a programming analytics system 102, one or more databases 104, 106, and a TV programming and recommendations content subnetwork 108. In particular embodiments, the programming analytics system 102 may include a cloud-based cluster computing architecture or other similar computing architecture that may receive one or more user automatic content recognition (ACR) user viewing data 110, which may be provided by first-party or third-party sources, and provide TV programming content and advertising content to one or more client devices (e.g., a TV, a standalone monitor, a desktop computer, a laptop computer, a tablet computer, a mobile phone, a wearable electronic device, a voice-controlled personal assistant device, an automotive display, a gaming system, an appliance, or other similar multimedia electronic device) suitable for displaying programming and advertising content and/or playing back programming and advertising content. Additionally, the programming analytics system 102 may be utilized to process and manage various analytics and/or data intelligence such as TV programming analytics, web analytics, user profile data, user payment data, user privacy preferences, and so forth. For example, in particular embodiments, the programming analytics system 102 may include a Platform as a Service (PaaS) architecture, a Software as a Service (SaaS) architecture, and an Infrastructure as a Service (IaaS), or other various cloud-based cluster computing architectures.

In particular embodiments, as further depicted by FIG. 1, the programming analytics system 102 may include a pre-processing functional block 112, a CI-GAN modeling block 114, and co-clustering correlation matrix functional block 116. In particular embodiments, the pre-processing functional block 112, a CI-GAN modeling block 114, and co-clustering correlation matrix functional block 116 may each include, for example, a computing engine. In particular embodiments, the pre-processing functional block 112 may receive the ACR user viewing data 110, which may include, for example, specific programming content (e.g., TV programming) recently viewed by one or more particular users or subgroups of users. For example, the ACR user viewing data 110 may include an identification of the recently viewed programming content (e.g., TV programs), metadata associated with the recently viewed programming content (e.g., TV programs), the particular timeslot (e.g., day-hour) the recently viewed programming content (e.g., TV programs) was viewed within, and the programming channel on which the programming content (e.g., TV programs) was viewed.

In particular embodiments, the pre-processing functional block 112 may then interface with the content database 104 to associate the recently viewed programming content included in the ACR user viewing data 110 with TV programming content stored by the database 104. For example, the TV programming content stored by the database 104 may include, for example, user or subgroup profile data, programming genre data, programing category data, programming clustering category group data, or other TV programming content or metadata that may be stored by the database 104. In particular embodiments, the ACR user viewing data 110 may include time-series data expressed in an hour context, day context, and/or day-hour context. For example, in particular embodiments, time-series ACR user viewing data 110 may be received, for example, every predetermined timeslot per time period.

In particular embodiments, the CI-GAN modeling block 114 may be provided for performing efficient data co-clustering and generating one or more TV programming recommendations or advertisements based thereon. In particular embodiments, as will be described in greater detail with respect to FIG. 2A below, the CI-GAN modeling block 114 may include a first GAN and a second GAN that may be part of a CI-GAN combiner model architecture for performing efficient data co-clustering. In particular embodiments, in conjunction or in the alternative, and as will be described in greater detail with respect to FIG. 2B below, the first GAN and the second GAN may be part of a CI-GAN autoencoder model architecture, in which the CI-GAN autoencoder model architecture performing efficient data co-clustering. In particular embodiments, the CI-GAN modeling block 114 may then provide determined co-clustering associations to the co-clustering correlation matrix functional block 116 for further processing and management.

For example, as further illustrated by FIG. 1, the programming analytics system 102 may provide determined co-clustering associations based on the CI-GAN models to the database 106. In particular embodiments, as further depicted by FIG. 1, a network-based content orchestrator 118 may retrieve the determined co-clustering associations from the database 106. The content orchestrator 118 may then store the determined co-clustering associations together with TV programming and recommendations to be viewed in a programming and advertising content database 120. In particular embodiments, based on the determined co-clustering associations, the content orchestrator 118 may then provide TV programming and recommendations content 122 to, for example, an end-user client device for user viewing.

Figure 2A:
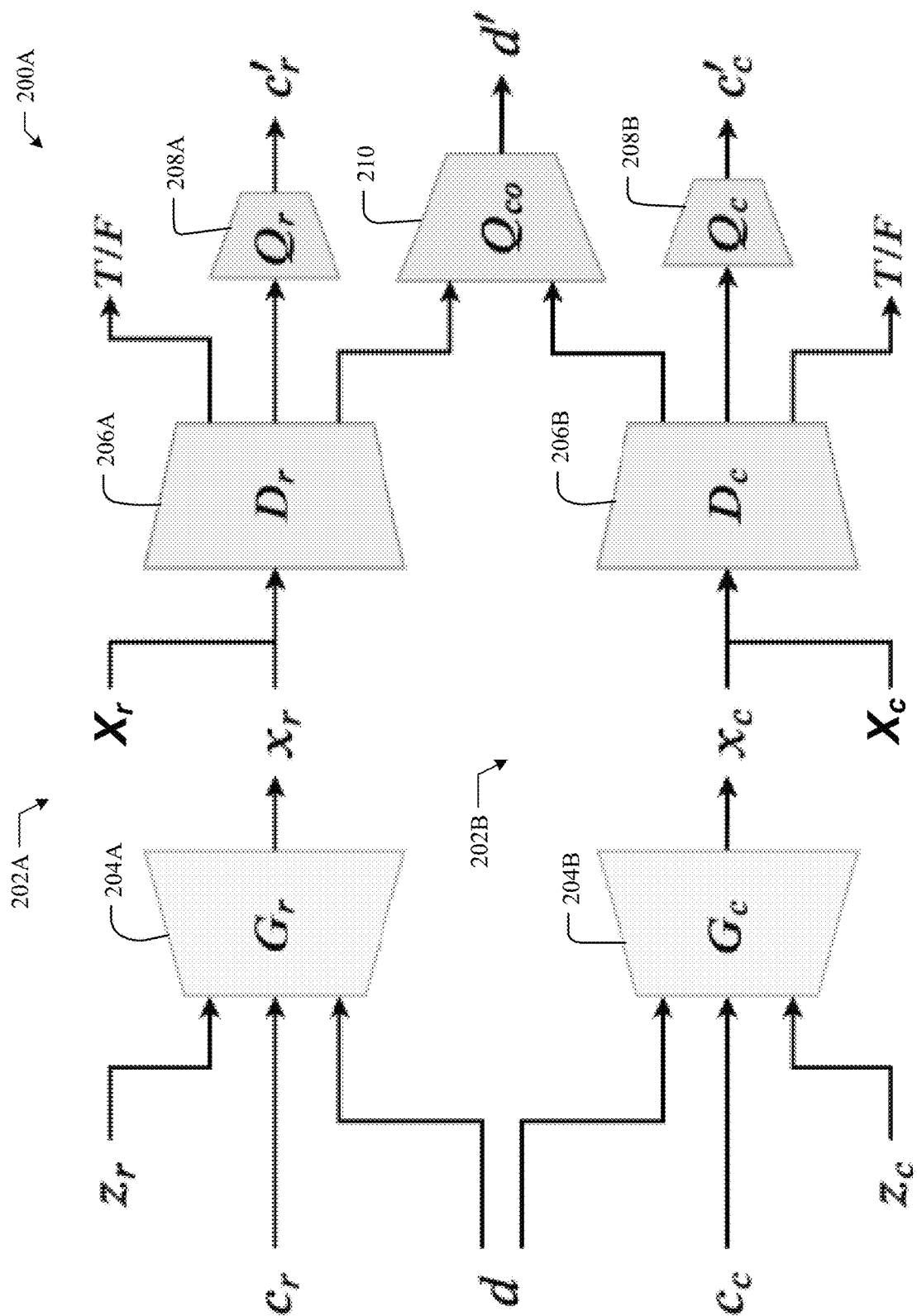
FIG. 2A illustrates an embodiment of a combiner CI-GAN model for efficient data co-clustering.

FIG. 2A illustrates an embodiment of a combiner CI-GAN model 200A for efficient data co-clustering, in accordance with the presently disclosed embodiments. In particular embodiments, the combiner CI-GAN model 200A may be provided for learning and determining underlying inter-relations between the row data and the column data of a data matrix based on, for example, a mutual information cost function. For example, in particular embodiments, the combiner CI-GAN model 200A may simultaneously co-cluster user behavioral data and user content viewing data to provide, for example, one or more programming recommendations or advertisements to an end user. In particular embodiments, as illustrated by FIG. 2A, the combiner CI-GAN model 200A may include a first GAN 202A and a second GAN 202B. For example, the first GAN 202A may be provided to cluster row data of data matrix, while the second GAN 202A may be provided to cluster column data of the data matrix (or vice-versa). In particular embodiments, one or more data matrices that may be co-clustered by the combiner CI-GAN model 200A may include, for example, user behavioral data as the row data and user content viewing data as the column data, video data as the row data and video-caption data as the column data, biological genetic data as the row data and biological condition data as the column data, movie data as the row data and music data as the column data, image data as the row data and audible data as the column data, or other similar data existing in two disparate data dimensions. For example, in particular embodiments, the first GAN 202A and the second GAN 202B may be respectively expressed as:

$$\text{row: } \min_{G_r, Q_r} \max_{D_r} V(D_r, G_r) - L_I(G_r, Q_r) \quad \text{(Equation 1), and}$$

$$\text{column: } \min_{G_c, Q_c} \max_{D_c} V(D_r, G_r) - L_I(G_c, Q_c) \quad \text{(Equation 2).}$$

In particular embodiments, as further depicted by FIG. 2A and in view of Equation 1 and Equation 2, the first GAN 202A may include a row generator 204A (e.g., "$G_r$"), a row discriminator 206A (e.g., "$D_r$"), and a row data distribution 208A (e.g., "$Q_r$"). Similarly, the second GAN 202B may include a column generator 204B (e.g., "$G_c$"), a column discriminator 206B (e.g., "$D_c$"), and a column data distribution 208B (e.g., "$Q_c$"). In particular embodiments, the row generator 204A (e.g., "$G_r$") and the column generator 204B (e.g., "$G_c$") may each include, for example, a neural network that may model a transform function in that the row generator 204A (e.g., "$G_r$") and the column generator 204B (e.g., "$G_c$") may be suitable for receiving any row input data (e.g., row random variable data) and column input data (e.g., column random variable data) and generating row random variable output data and column random variable output data according to one or more targeted distribution functions. For example, in particular embodiments, the row generator 204A (e.g., "$G_r$") may receive a row data input vector $c_r$, a row random variable $z_r$, and a co-cluster label d. Similarly, the column generator 204B (e.g., "$G_c$") may receive a column data input vector $c_c$, a column random variable $z_c$, and the co-cluster label d. In particular embodiments, the co-cluster label d may include, for example, a categorical vector that may be designed to a size of $c_r \times c_c$ (e.g., as row data input vector $c_r$ and column data input vector $c_c$ may represent cluster pairs or co-clusters). In one example, the co-cluster label d may be expressed as:

$$\min_{G,Q} \max_R V(D_r, G_r) + V(D_c, G_c) - L_I(G_r, G_c, Q_{co}) \quad \text{(Equation 3)}.$$

In particular embodiments, referring to Equation 3 and FIG. 2A, the row generator 204A (e.g., "$G_r$") and the column generator 204B (e.g., "$G_c$") may then generate a fake row data vector $x_r$ and a fake column data vector $x_c$, respectively. For example, the fake row data vector $x_r$ and the fake column data vector $x_c$ may represent, for example, one or more fake data samples (e.g., fake unlabeled data samples) of the row data input vector $c_r$ and the column data input vector $c_c$, respectively. In particular embodiments, the row generator 204A (e.g., "$G_r$") may provide the fake row data vector $x_r$ to the row discriminator 206A (e.g., "$D_r$"), and the column generator 204B (e.g., "$G_c$") may provide the fake column data vector $x_c$ to the column discriminator 206B (e.g., "$D_c$"). For example, as further depicted, the row discriminator 206A (e.g., "$D_r$") may receive the fake row data vector $x_r$ and a real row data vector $X_r$, and the column discriminator 206B (e.g., "$D_c$") may receive the fake column data vector $x_c$ and a real column data vector $X_c$. In particular embodiments, the row discriminator 206A (e.g., "$D_r$") is trained with the real row data vector $X_r$ prior to receiving the fake row data vector $x_r$, and the column discriminator 206B (e.g., "$D_c$") is trained with the real column data vector $X_c$ prior to receiving the fake column data vector $x_c$. For example, the real row data vector $X_r$ and the real column data vector $X_c$ may represent, for example, one or more real data samples (e.g., real unlabeled data samples) of the row data input vector $c_r$ and the column data input vector $c_c$, respectively.

Specifically, in particular embodiments, as part of the training of the first GAN 202A and the second GAN 202B, the row generator 204A (e.g., "$G_r$") may be provided to "fool" the row discriminator 206A (e.g., "$D_r$") and the column generator 204B (e.g., "$G_c$") may be provided to "fool" the column discriminator 206B (e.g., "$D_c$"). This "fooling" technique may be utilized, for example, to maximize a final classification error between, for example, the fake row data vector $x_r$ and the real row data vector $X_r$, as well as between the fake column data vector $x_c$ and the real column data vector $X_c$, respectively. In contrast, the row discriminator 206A (e.g., "$D_r$") and the column discriminator 206B (e.g., "D") may be provided, for example, to detect the fake row data vector $x_r$ and the fake column data vector $x_c$ to minimize the final classification error between, for example, the fake row data vector $x_r$ and the real row data vector $X_r$, as well as between the fake column data vector $x_c$ and the real column data vector $X_c$, respectively. For example, in particular embodiments, the row generator 204A (e.g., "$G_r$") and the column generator 204B (e.g., "$G_c$") may generate fake data to attempt to "fool" the row discriminator 206A (e.g., "$D_r$") and the column discriminator 206B (e.g., "$D_c$"), respectively. The row discriminator 206A (e.g., "$D_r$") and the column discriminator 206B (e.g., "$D_c$") may receive as input the fake data and then output True (e.g., if the fake data fools the row discriminator 206A (e.g., "$D_r$") and the column discriminator 206B (e.g., "$D_c$") into determining that the fake data is real data) or False (e.g., if the row discriminator 206A (e.g., "$D_r$") and the column discriminator 206B (e.g., "$D_c$") does not to determine the fake data is real data). If the row discriminator 206A (e.g., "$D_r$") and the column discriminator 206B (e.g., "$D_c$") output False, then the row generator 204A (e.g., "$G_r$") and the column generator 204B (e.g., "$G_c$") is penalized and trained to produce better fake data for "fooling" the row discriminator 206A (e.g., "$D_r$") and the column discriminator 206B (e.g., "$D_c$"). Thus, the row discriminator 206A (e.g., "$D_r$") and the column discriminator 206B (e.g., "$D_c$") may also provide true/false (e.g., "T/F") outputs indicating the final classification errors between the fake row data vector $x_r$ and the real row data vector $X_r$ and between the fake column data vector $x_c$ and the real column data vector $X_c$, respectively.

In particular embodiments, the row discriminator 206A (e.g., "$D_r$") and the column discriminator 206B (e.g., "$D_c$") may then provide an output to a row clustering distribution model 208A (e.g., $Q_r$), a column clustering distribution model 208B (e.g., $Q_c$), and an auxiliary clustering distribution model 210 (e.g., $Q_{co}$). In particular embodiments, the row clustering distribution model 208A (e.g., $Q_r$) and the column clustering distribution model 208B (e.g., $Q_c$) may generate row data output vector $c_r'$ and the column data output vector $c_c'$. The row data output vector $c_r'$ and the column data output vector $c_c'$ may each include, for example, 1D clusters of the row data of the row data input vector $c_r$ and the column data of the column data input vector $c_c$, respectively. In particular embodiments, the auxiliary clustering distribution model 210 (e.g., $Q_{co}$) may reconstruct one or more co-cluster labels d and generate one or more co-cluster labels d'.

Figure 2B:
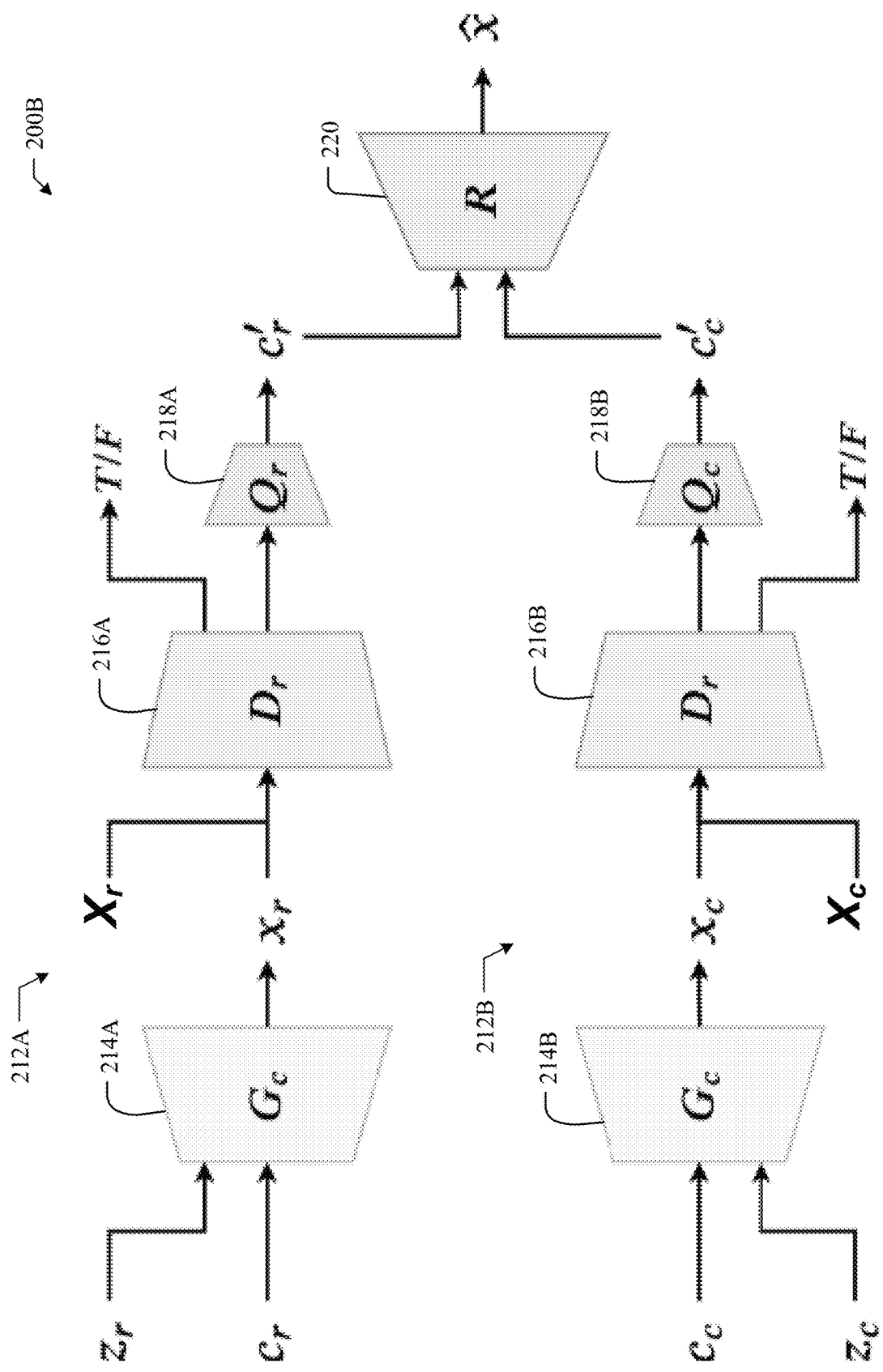
FIG. 2B illustrates an embodiment of an autoencoder CI-GAN model for efficient data co-clustering.

FIG. 2B illustrates an embodiment of an autoencoder CI-GAN model 200B for efficient data co-clustering, in accordance with the presently disclosed embodiments. In particular embodiments, the autoencoder CI-GAN model 200B may be provided for determining a lower bound by which to define an objective function corresponding to a mutual information (e.g., I) between row data and column data of a data matrix and co-clustered associations. Particularly, the autoencoder CI-GAN model 200B may maximize the mutual information (e.g., 1) between the original data row data and column data and the CI-GAN-generated co-clustered associations for improved model optimization. In one example, the maximization of the mutual information I may be expressed as:

$$\max I(X_r; X_c; c_r'; c_c') \quad \text{(Equation 4)}.$$

Specifically, in particular embodiments, the autoencoder CI-GAN model 200B may simultaneously co-cluster user behavioral data and user content viewing data to provide, for example, one or more programming recommendations or advertisements to an end user. In particular embodiments, as illustrated by FIG. 2B, the autoencoder CI-GAN model 200B may include a first GAN 212A and a second GAN 212B. For example, the first GAN 212A may be provided to cluster row data of data matrix, while the second GAN 212A may be provided to cluster column data of the data matrix (or vice-versa). In particular embodiments, one or more data matrices that may be co-clustered by the autoencoder CI-GAN model 200B may include, for example, user behavioral data as the row data and user content viewing data as the column data, video data as the row data and video-caption data as the column data, biological genetic data as the row data and biological condition data as the column data, movie data as the row data and music data as the column data, image data as the row data and audible data as the column data, or other similar data existing in two disparate data dimensions.

In particular embodiments, as further depicted by FIG. 2B, the first GAN 212A may include a row generator 214A (e.g., "$G_r$"), a row discriminator 216A (e.g., "$D_r$"), and a row data distribution 218A (e.g., "$Q_r$"). Similarly, the second GAN 212B may include a column generator 214B (e.g., "$G_c$"), a column discriminator 216B (e.g., "$D_c$"), and a column data distribution 218B (e.g., "$Q_c$"). In particular embodiments, the row generator 214A (e.g., "$G_r$") and the column generator 214B (e.g., "$G_c$") may each include, for example, a neural network that may model a transform function in that the row generator 214A (e.g., "$G_r$") and the column generator 214B (e.g., "$G_c$") may be suitable for receiving any row input data (e.g., row random variable data) and column input data (e.g., column random variable data) and generating row random variable output data and column random variable output data according to one or more targeted distribution functions. For example, in particular embodiments, the row generator 214A (e.g., "$G_r$") may receive a row data input vector $c_r$, a row random variable $z_r$, and a co-cluster label d. Similarly, the column generator 214B (e.g., "$G_c$") may receive a column data input vector $c_c$, a column random variable $z_c$, and the co-cluster label d. In particular embodiments, the co-cluster label d may include, for example, a categorical vector that may be designed to a size of $c_r \times c_c$ (e.g., as row data input vector $c_r$ and column data input vector $c_c$ may represent cluster pairs or co-clusters).

In particular embodiments, the row generator 214A (e.g., "$G_r$") and the column generator 214B (e.g., "$G_c$") may then generate a fake row data vector $x_r$ and a fake column data vector $x_c$, respectively. For example, the fake row data vector $x_r$ and the fake column data vector $x_c$ may represent, for example, one or more fake data samples (e.g., fake unlabeled data samples) of the row data input vector $c_r$ and the column data input vector $c_c$, respectively. In particular embodiments, the row generator 214A (e.g., "$G_r$") may provide the fake row data vector $x_r$ to the row discriminator 216A (e.g., "$D_r$"), and the column generator 214B (e.g., "$G_c$") may provide the fake column data vector $x_c$ to the column discriminator 216B (e.g., "$D_c$"). For example, as further depicted, the row discriminator 216A (e.g., "$D_r$") may receive the fake row data vector $x_r$ and a real row data vector $X_r$, and the column discriminator 216B (e.g., "$D_c$") may receive the fake column data vector $x_c$ and a real column data vector $X_c$. In particular embodiments, the row discriminator 206A (e.g., "$D_r$") may be trained with the real row data vector $X_r$ prior to receiving the fake row data vector $x_r$, and the column discriminator 206B (e.g., "$D_c$") may be trained with the real column data vector $X_c$ prior to receiving the fake column data vector $x_c$. For example, the real row data vector $X_r$ and the real column data vector $X_c$ may represent, for example, one or more real data samples (e.g., real unlabeled data samples) of the row data input vector $c_r$ and the column data input vector $c_c$, respectively.

Specifically, in particular embodiments, as part of the training of the first GAN 212A and the second GAN 212B, the row generator 214A (e.g., "$G_r$") may be provided to "fool" the row discriminator 216A (e.g., "$D_r$") and the column generator 214B (e.g., "$G_c$") may be provided to "fool" the column discriminator 216B (e.g., "$D_c$"). This "fooling" technique may be utilized, for example, to maximize a final classification error between, for example, the fake row data vector $x_r$ and the real row data vector $X_r$, as well as between the fake column data vector $x_c$ and the real column data vector $X_c$, respectively. In contrast, the row discriminator 216A (e.g., "$D_r$") and the column discriminator 216B (e.g., "$D_c$") may be provided, for example, to detect the fake row data vector $x_r$ and the fake column data vector $x_c$ to minimize the final classification error between, for example, the fake row data vector $x_r$ and the real row data vector $X_r$, as well as between the fake column data vector $x_c$ and the real column data vector $X_c$, respectively.

In particular embodiments, the row discriminator 216A (e.g., "$D_r$") and the column discriminator 216B (e.g., "$D_c$") may then provide an output to a row clustering distribution model 218A (e.g., $Q_r$) and a column clustering distribution model 218B (e.g., $Q_c$.) The row discriminator 216A (e.g., "$D_r$") and the column discriminator 216B (e.g., "$D_c$") may also provide true/false (e.g., "T/F") outputs indicating the final classification errors between the fake row data vector $x_r$ and the real row data vector $X_r$ and between the fake column data vector $x_c$ and the real column data vector $X_c$, respectively. In particular embodiments, the row clustering distribution model 218A (e.g., $Q_r$) and the column clustering distribution model (e.g., $Q_c$) may generate row data output vector $c_r'$ and the column data output vector $c_c'$. The row data output vector $c_r'$ and the column data output vector $c_c'$ may each include, for example, 1D clusters of the row data of the row data input vector $c_r$ and the column data of the column data input vector $c_c$, respectively.

In particular embodiments, as further illustrated by the autoencoder CI-GAN model 200B of FIG. 2B, a reconstructor 220 (e.g., R) may receive as inputs the row data output vector $c_r'$ and the column data output vector $c_c'$. In particular embodiments, the reconstructor 220 (e.g., R) may include a distribution model that may be utilized to, based on the row data output vector $c_r'$ and the column data output vector $c_c'$, learn and reconstruct the fake row data vector $x_r$ and the fake column data vector $x_c$, and, by extension, the original row data input vector $c_r$ and the original column data input vector $c_c$. In particular embodiments, the row clustering distribution model 218A (e.g., $Q_r$) and the column clustering distribution model (e.g., $Q_c$), as well as the reconstructor 220 (e.g., R), may be defined by a lower bound that optimizes the autoencoder CI-GAN model 200B by increasing, for example, the mutual information (e.g., 1) between the original row data input vector $c_r$ and the original column data input vector $c_c$ and the row data output vector $c_r'$ and the column data output vector $c_c'$.

Figure 3B:
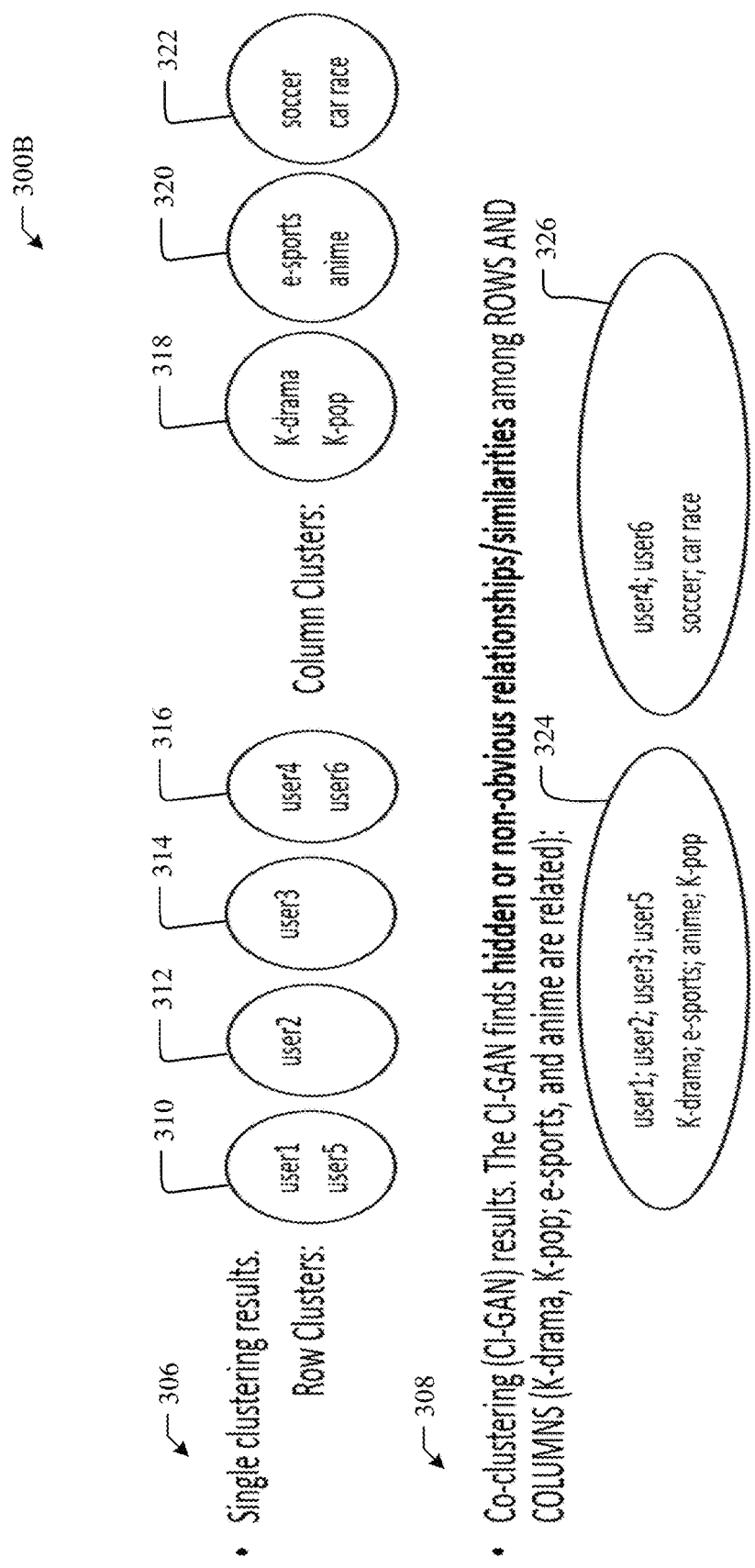
FIG. 3B illustrates an example diagram of utilizing a CI-GAN to perform efficient data-clustering.

FIG. 3A and FIG. 3B illustrate a diagram 300A and a diagram 300B, depicting a running example of utilizing a CI-GAN (as described above with respect to FIGS. 2A and 2B) for efficient data co-clustering, in accordance with the presently disclosed embodiments. For example, the diagram 300A may include a data matrix, which may include, for example, user behavioral data as row data 302 and user content viewing data as column data 304. To build useful and interesting 2D data co-clusters for the purposes of, for example, providing programming recommendations and advertising content that may be better suited to the desires, preferences, and interests of certain users, co-clustering of the data matrix may be performed by the combiner CI-GAN model 200A and/or the autoencoder CI-GAN model 200B. As illustrated by the user behavioral row data 302 and the user content viewing column data 304, User 1 watches Korean dramas (e.g., K-Dramas) and changes programming channels 8 times per hour; User 2 watches e-sports (e.g., video-game videos) and changes programming channels 12 times per hour; User 3 watches anime and changes programming channels 5 times per hour; User 4 watches soccer and changes programming channels 1 time per hour; User 5 watches Korean pop music videos (e.g., K-Pop) and changes programming channels 9 times per hour; and User 6 watches car racing and changes programming channels 2 times per hour.

FIG. 3B illustrates a diagram 306 based on the data matrix of FIG. 3A, in which a less advanced singular dimensional data clustering is performed as compared to a diagram 308 illustrating the advance techniques of utilizing a CI-GAN model (the combiner CI-GAN model 200A and/or the autoencoder CI-GAN model 200B) for efficient data co-clustering as described herein. As depicted by the diagram 306, the less advanced singular dimensional data clustering may produce only poor and nonspecific user clusters 310, 312, 314, and 316 and TV programming clusters 318, 320, and 322. Without the presently disclosed techniques, one or more co-clusters that correlates the user behavioral row data 302 and the user content viewing column data 304 could not be achieved. In particular embodiments, as depicted by the diagram 308, the CI-GAN model (the combiner CI-GAN model 200A and/or the autoencoder CI-GAN model 200B) may find one or more hidden and unobvious underlying interrelations (e.g., underlying relationships, similarities) among the user behavioral row data 302 and the user content viewing column data 304. For example, the co-cluster 324 illustrates determined interrelations between K-Drama, K-Pop, E-sports, and anime, and thus clusters User 1, User 2, User 3, and User 5 together with K-Drama, K-Pop, E-sports, and anime, for example. Similarly, the co-cluster 326 illustrates determined interrelations between soccer and car racing, and thus clusters User 4 and User 6 together with soccer and car racing. Specifically, as the forgoing illustrates, 1D clustering diagram 306 clusters rows independently of columns, and vice versa. As such, when clustering rows in this example, diagram 306 may cluster User 4 and User 6 as one cluster 316 (who changed channels 1-2 times), User 3 as another cluster 314 (who changed channels 5 times), User 2 as another cluster 312 (who changed channels 12 times), User 1 and User 5 as one cluster 310 (who changed channels 8-9 times). Continuing, diagram 306 may cluster User 1 and User 5 as one cluster 318 (who watched K-pop and K-drama), User 2 and User 3 as another cluster 320 (who watched e-sports and anime), and User 4 and User 6 as another cluster 318 (who watched soccer and car racing). However, the diagram 306 as compared to the diagram 308 illustrates that the 1D clustering technique may miss one or more hidden and unobvious underlying interrelations. In contrast, the CI-GAN based efficient data co-clustering techniques, as disclosed herein and as illustrated by the diagram 308, may find such hidden and unobvious underlying interrelations. Thus, the present techniques may be utilized to provide both programming recommendations and advertising content that may be better suited to, for example, the desires, preferences, and interests of individual users and/or individual subgroups of users. Indeed, the present techniques may improve programming personalization/recommendation, ad-targeting (e.g., displaying relevant ads to particular users), content demand prediction (e.g., predicting what content particular users want to watch), personalized device settings (e.g., if particular users watch nature shows, then adjust device color settings), among various other applications.

Figure 3C:
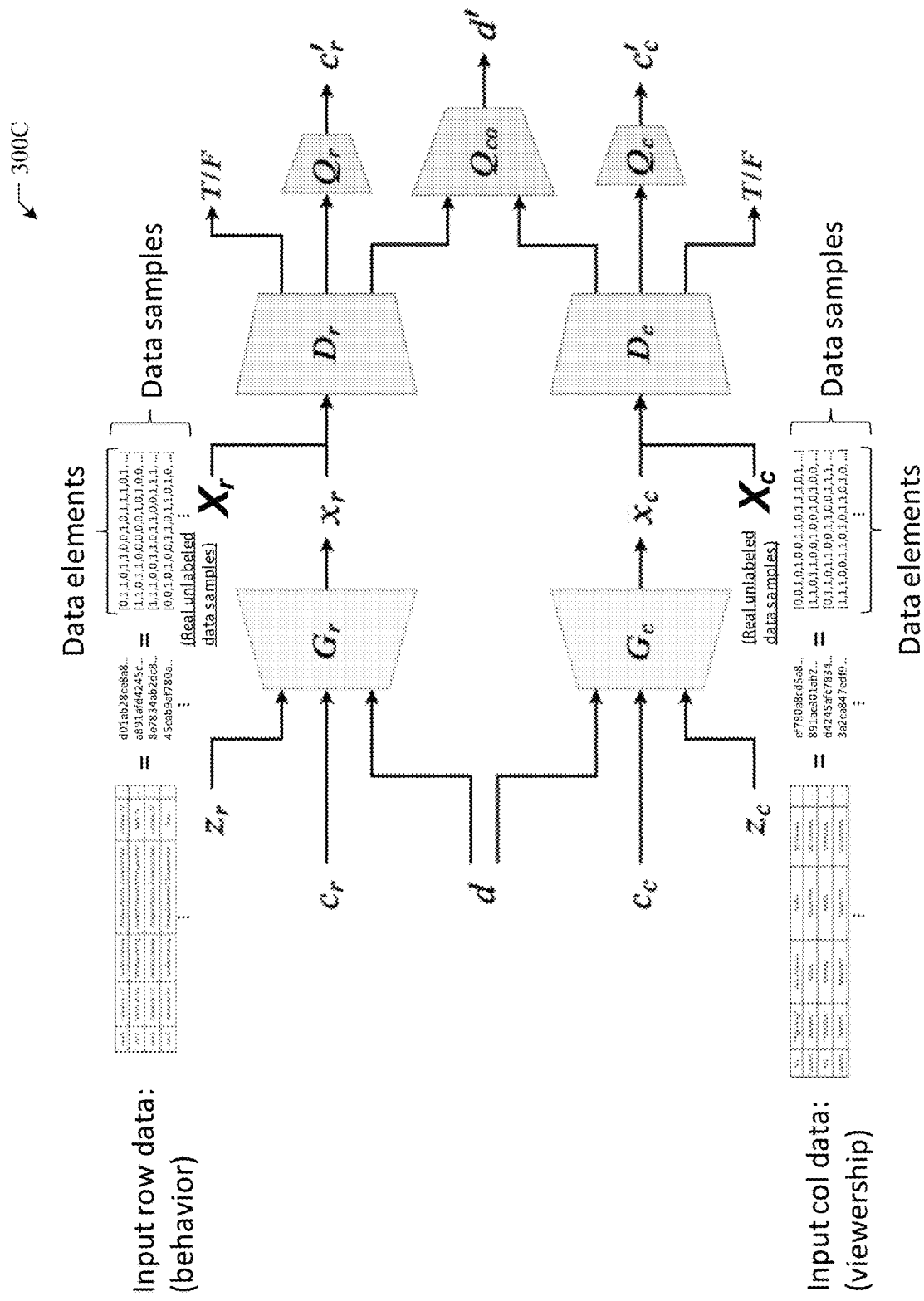
FIGS. 3C-3Q illustrate example training phases and additional running examples of utilizing a CI-GAN for efficient data co-clustering.
Figure 3D:
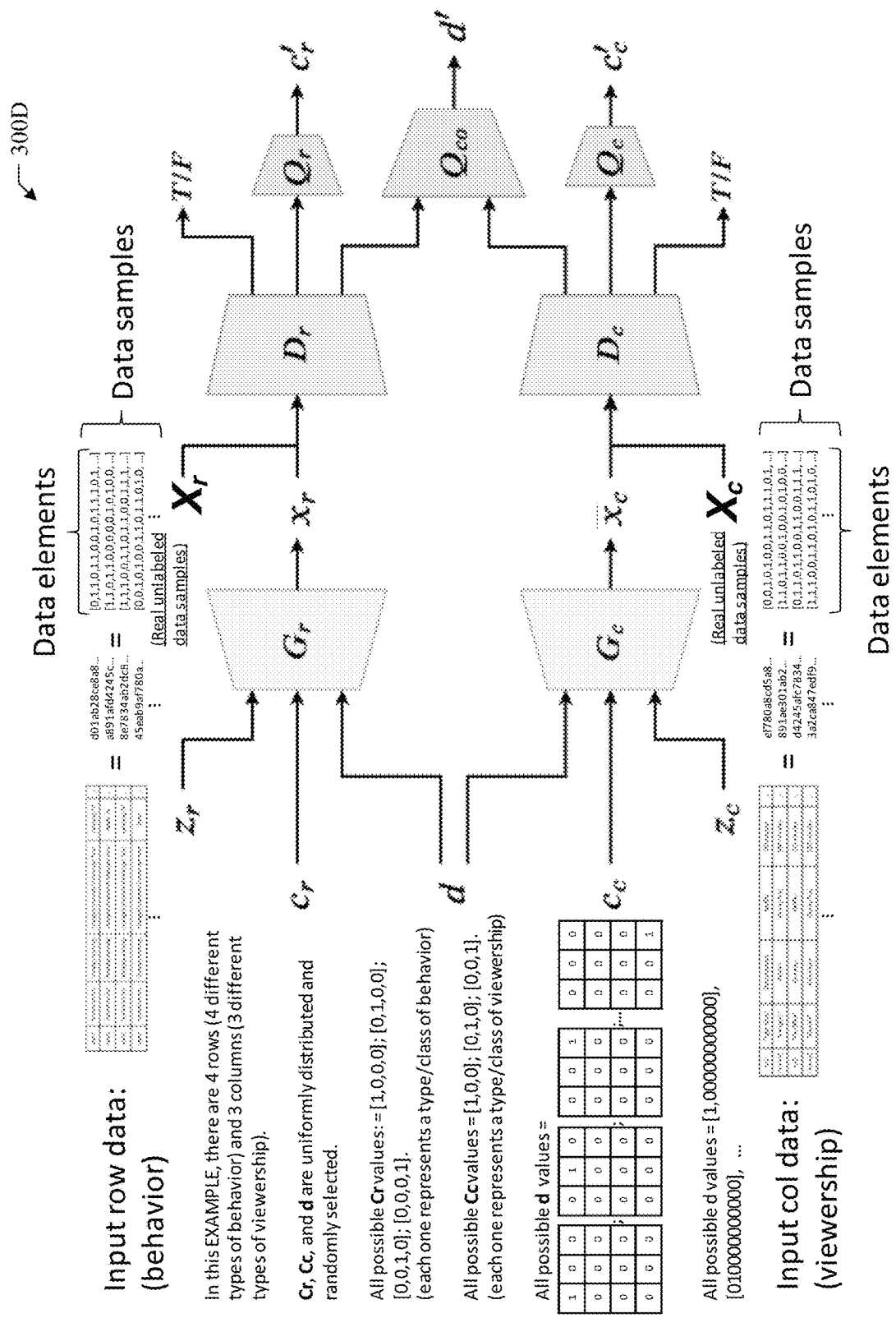
FIG. 3A illustrates an example diagram of utilizing a CI-GAN to perform efficient data-clustering.
FIGS. 3R-3T illustrate example inferring phases and additional running examples of utilizing a CI-GAN for efficient data co-clustering.
Figure 3E:
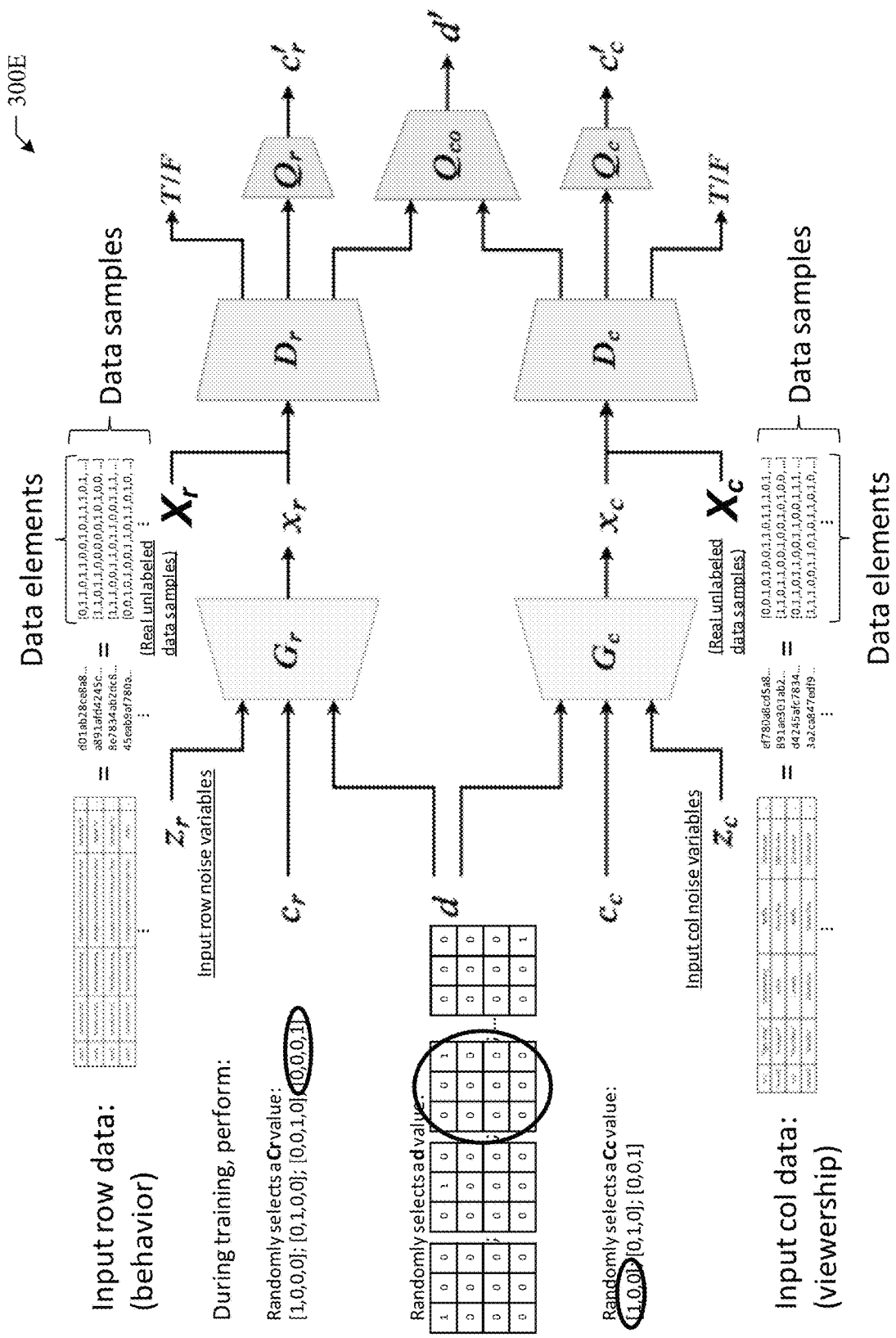
Figure 3F:
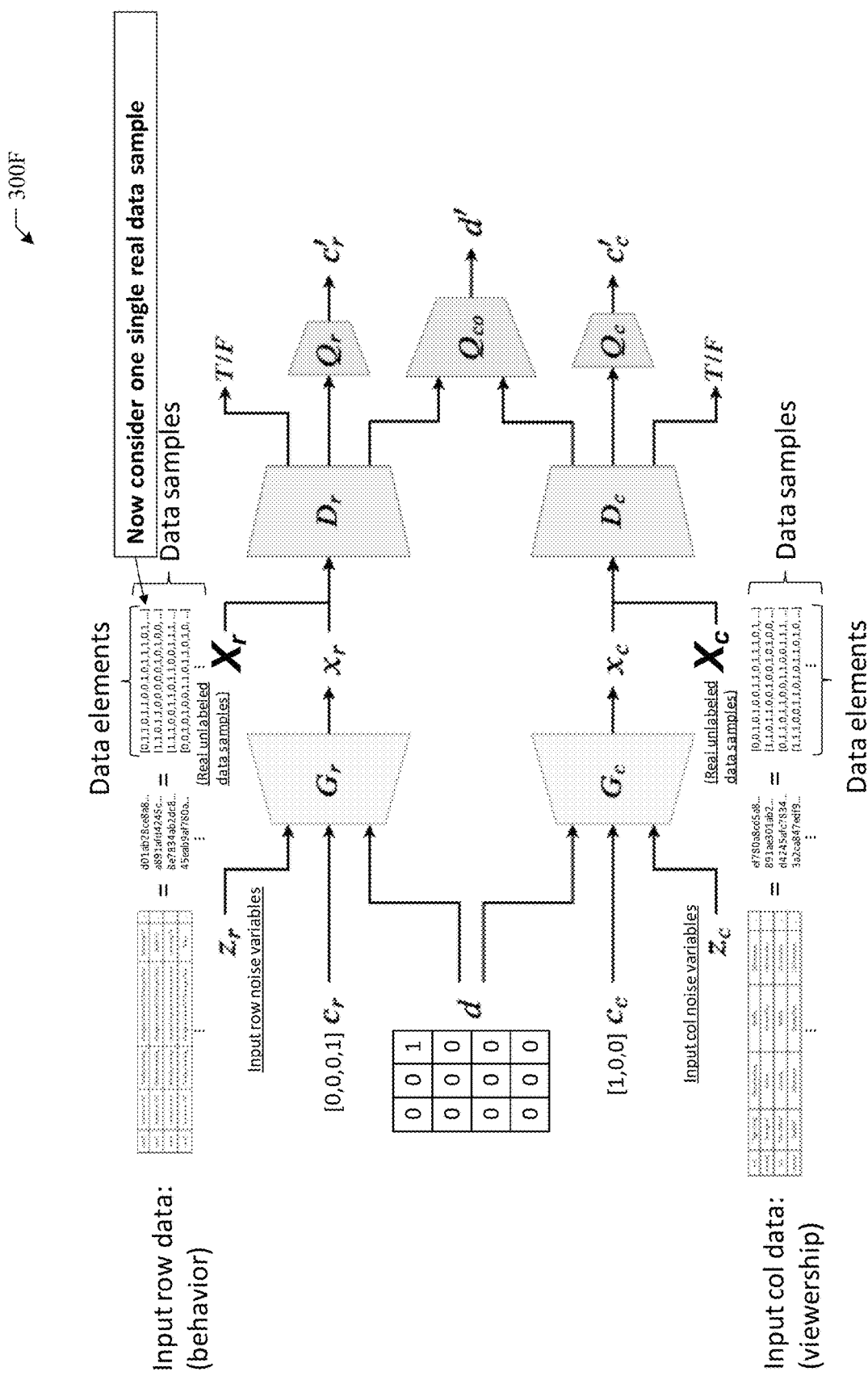
Figure 3G:
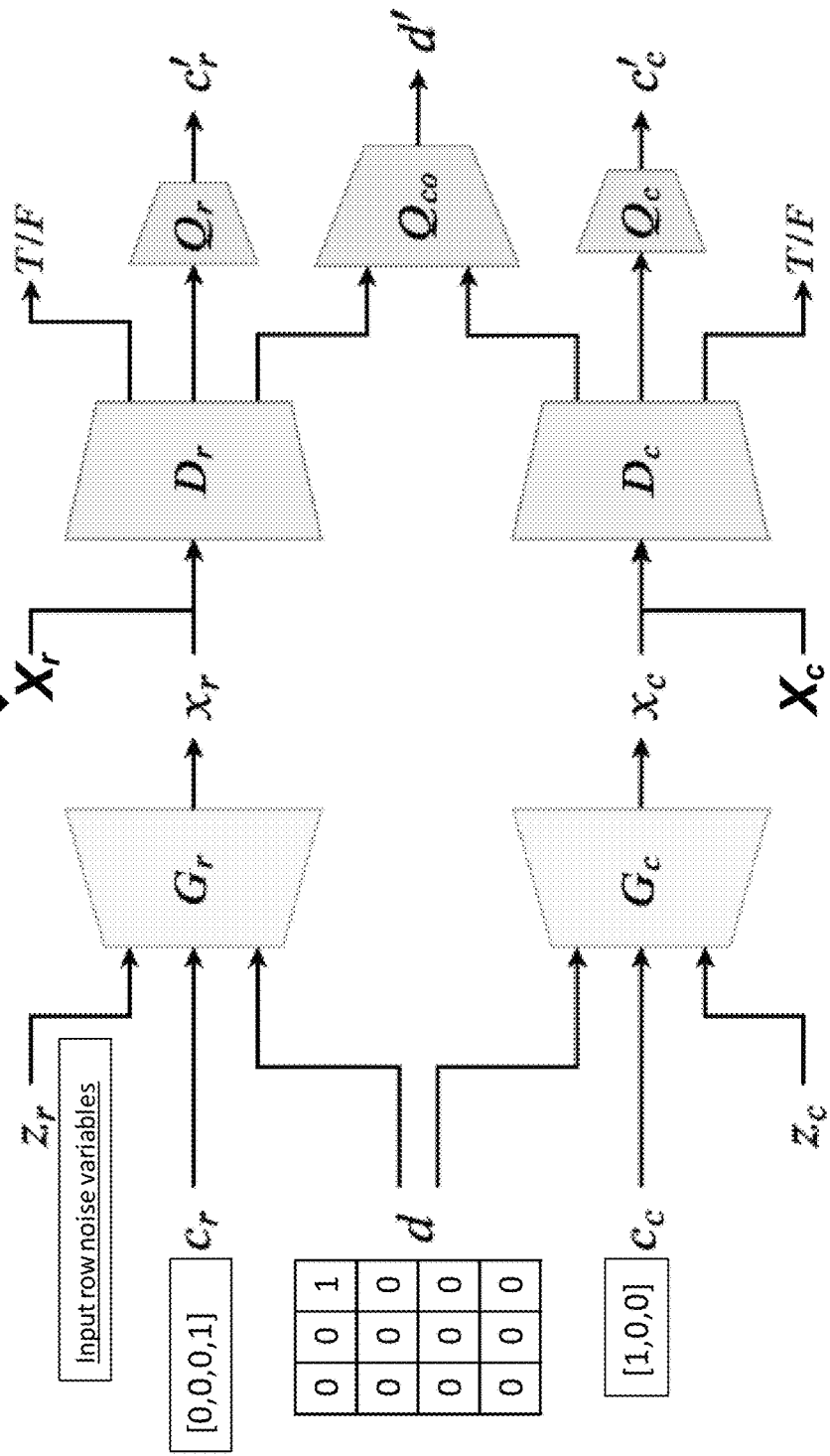
Figure 3H:
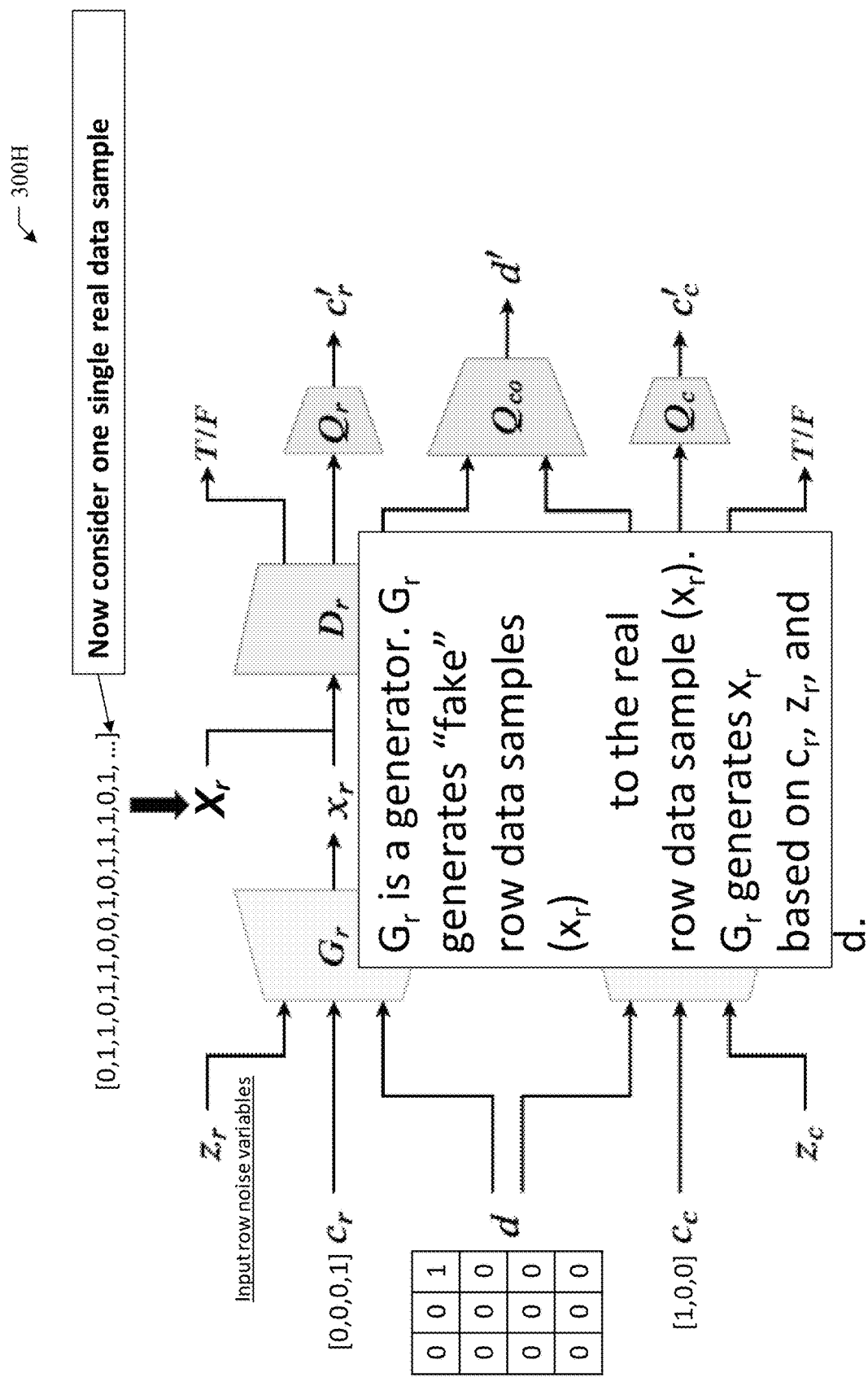
Figure 3J:
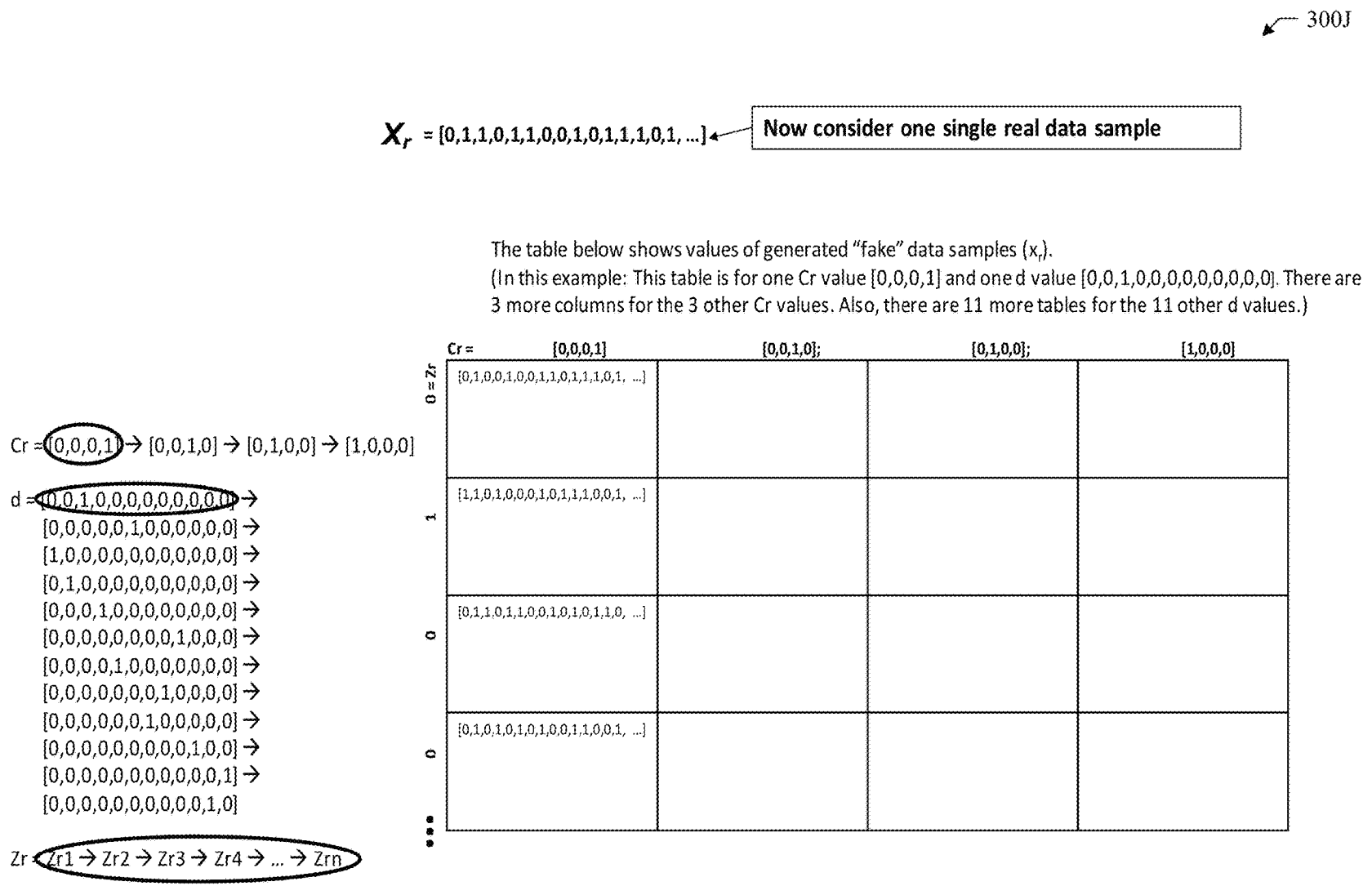
Figure 3N:
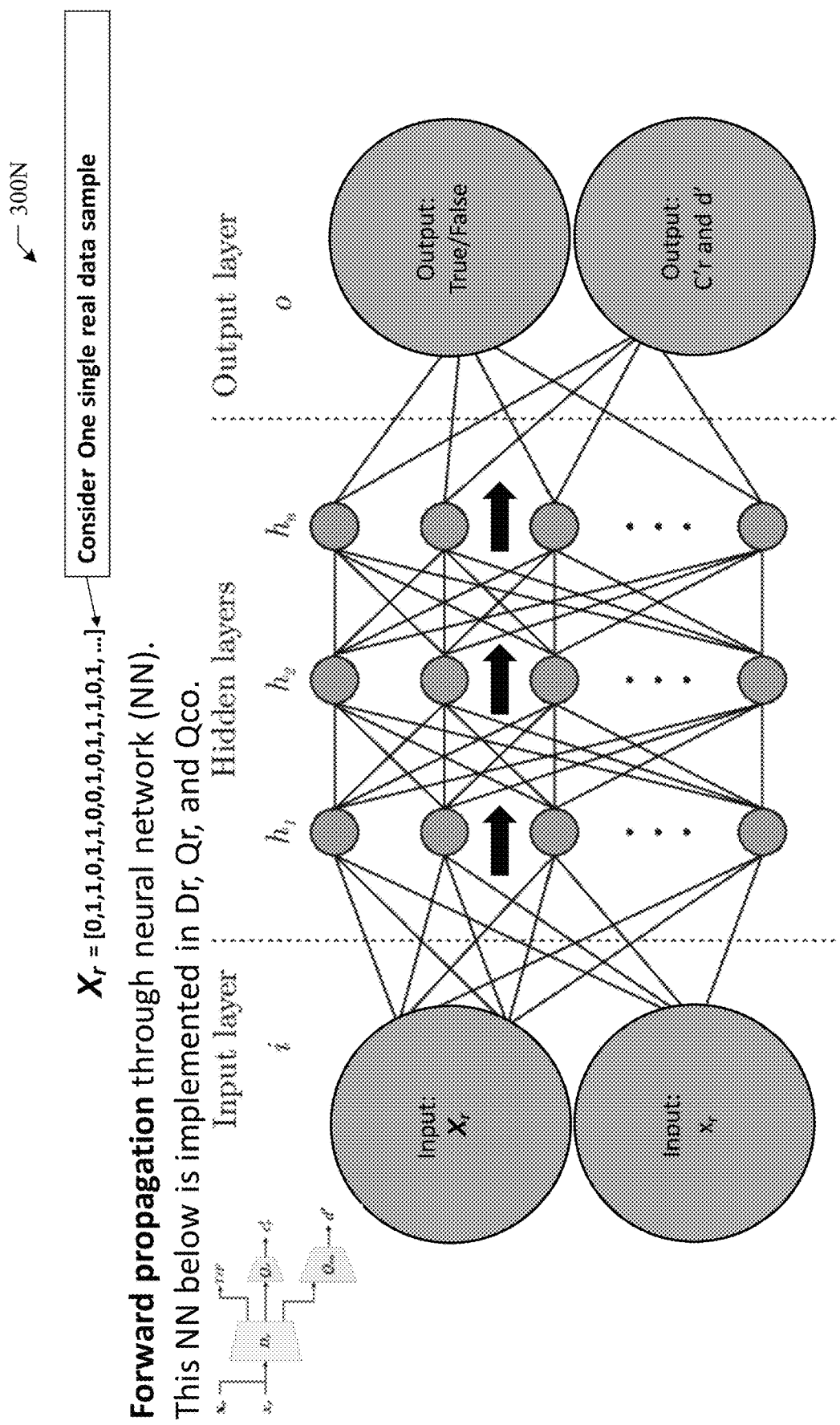
Figure 3O:
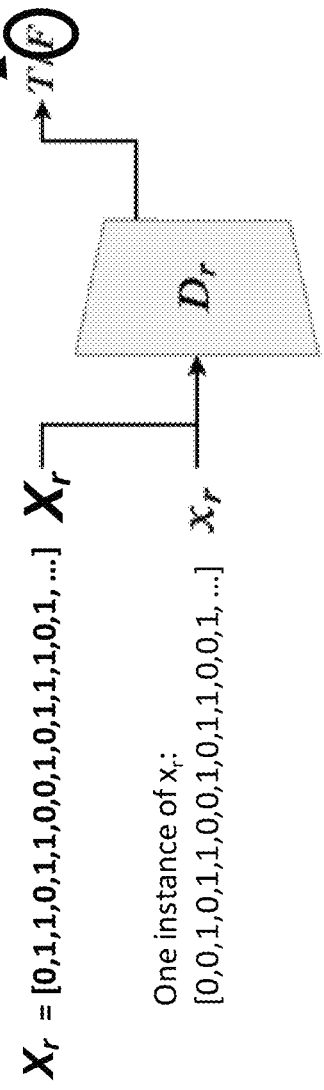
Figure 3P:
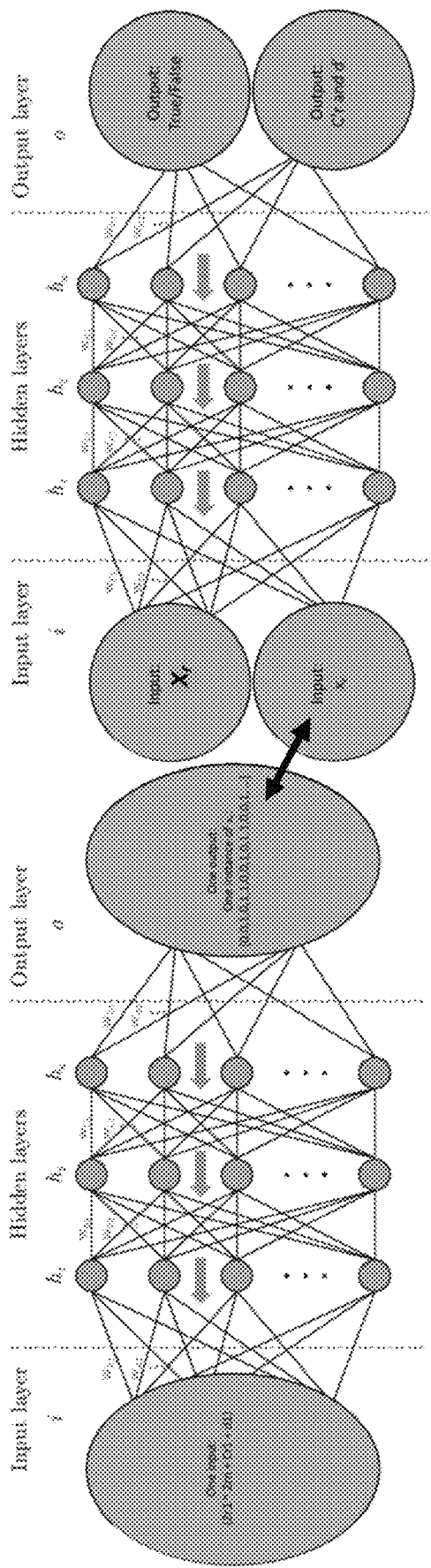
Figure 3Q:
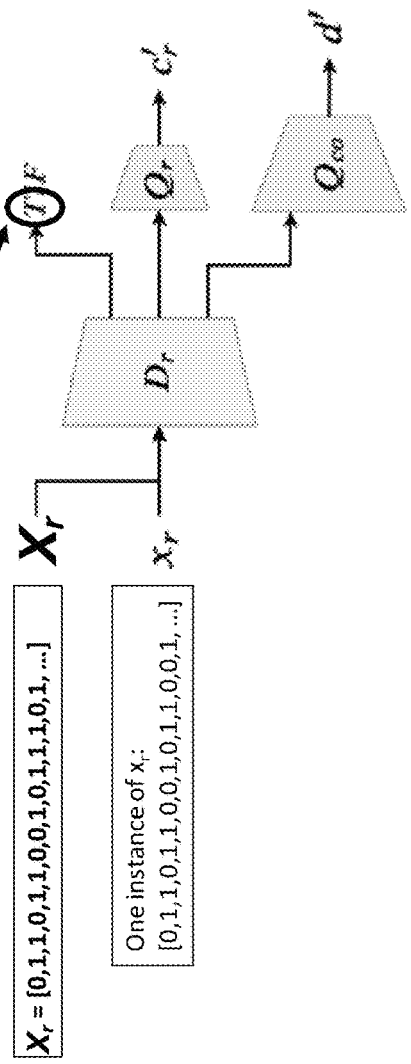

FIGS. 3C-3Q illustrate example training phases and additional running examples of utilizing a CI-GAN (as described above with respect to FIGS. 2A and 2B) for efficient data co-clustering, in accordance with the presently disclosed embodiments. For example, FIG. 3C illustrates a running example utilizing, for example, the combiner CI-GAN model 200A. In this embodiment, assume that, for example, a data analyst wants to find 12 co-clusters (e.g., groupings in both user dimensions). Thus, example 300C of FIG. 3C illustrates that the data analyst may decide to have 12 co-clusters (e.g., 4 rows by 3 columns, because the analyst believes there probably are more behavior groupings than viewership groupings). In the example 300D of FIG. 3D, there are 4 rows (e.g., 4 different types of behavior) and 3 columns (e.g., 3 different types of viewership). In this example, $c_c$, $c_r$, and d are uniformly distributed and randomly selected. For example, for all possible values of $c_r$, each represents a type/class of behavior and for all possible values of $c_c$, each represents a type/class of viewership. All possible values for the co-cluster label dis also illustrated, in this example. FIG. 3E illustrates a training example 300E, which illustrates that, during the training phase, random values for $c_c$, $c_r$, and d may be selected. FIGS. 3F and 3G illustrate a training examples 300F and 300G, which considers one particular real data sample as an input. FIG. 3F illustrates a training example 300F, which considers one particular real data sample. Based on the real data sample input, the example 300H of FIG. 3H illustrates that $G_r$ generates "fake" row data samples $x_r$ based on based on $c_r$, $z_r$, and d to try to be similar to the real row data sample $X_r$.

FIG. 3I illustrates an example 300I of a partial iteration of training for one real data sample Xr based on one particular $c_r$ value, one particular d value, and one particular $z_r$ value. It should be appreciated that, during implementation, training for all real data samples Xr, all possible $c_r$ values, all possible d value, and all possible $z_r$ values may be performed. FIG. 3J illustrates an example 300J, which shows the continued training for the one real data sample $X_r$ based on one particular $c_r$ value, one particular d value, and one particular $z_r$ value for an additional n number of columns. Specifically, the training may be continued for the one real data sample $X_r$ based on the one d value, the one Cr value, and all $z_r$ values. Training iterations may be then repeated (cycles of forward propagation and back propagation) until $x_r$ is similar to $X_r$. In this example, approximately 7 million parameters can be used, however it is contemplated that any suitable number of parameters can be used with the disclosed technology. FIG. 3K illustrates an example 300K, which includes a forward propagation and backward propagation example. The forward propagation and backward may be performed to make $x_r$ similar to $X_r$ and to maximize mutual information, which may be expressed as:

$$\min_{G,Q} \max_D V_{InfoGAN}(D,G,Q) = V(D,G) - \lambda L_I(G,Q) \quad \text{(Equation 5)}.$$

FIG. 3L illustrates an example 300L, which depicts a neural network (NN) 302L that may be implemented for the row generator 214A (e.g., "$G_r$"). For example, this or another NN may be implemented for the column generator 214B (e.g., "$G_c$"). Through forward propagation, based on input values $c_r$, $z_r$, and d, one or more instances of "fake" row data samples $x_r$ may be generated. FIG. 3M illustrates an example 300M, which depicts various rows and/or columns for input values $c_r$, $z_r$, and d and corresponding "fake" row data samples $x_r$. FIG. 3N illustrates an example 300N, which depicts a NN that may be implemented on the row clustering distribution model 208A (e.g., $Q_r$), the auxiliary clustering distribution model 210 (e.g., $Q_{co}$), and/or the row discriminator 206A (e.g., "$D_r$"). Through forward propagation, the "fake" row data samples $x_r$ and the real row data samples $X_r$ may be inputted and compared, and the outputs may be True/False (T/F) and the row data output vector $c_r'$ and generate one or more co-cluster labels d'. In some embodiments, d' takes into account information from $G_r$, $D_r$, $Q_{co}$, but also from $G_c$ and $D_{rc}$.

FIG. 3O illustrates an example 300O, which depicts the row discriminator 206A (e.g., "$D_r$"). In some embodiments, the column discriminator 206B (e.g., "$D_c$") can be depicted in a similar manner. Specifically, the row discriminator 206A (e.g., "$D_r$") and the column discriminator 206B (e.g., "$D_c$") may provide True/False (e.g., "T/F") outputs indicating the final classification errors between the fake row data vector $x_r$ and the real row data vector $X_r$ and/or between the fake column data vector $x_c$ and the real column data vector $X_c$, respectively. For example, the row discriminator 206A (e.g., "$D_r$") may determine whether the fake row data samples $x_r$ are sufficiently similar to the $X_r$ (e.g., True or False). If the fake row data samples $x_r$ and the real data samples $X_r$ are determined not to be sufficiently similar (e.g., False), then back propagation may be performed. FIG. 3P illustrates an example 300P, which includes NNs that may include, for example, one or more weights that may be utilized to increase similarity between the fake row data samples $x_r$ and the real data samples $X_r$. For example, the weights (e.g., $w_n$) of the NNs may be modified (e.g., increased or decreased) to increase similarity between the fake row data samples $x_r$ and the real data samples $X_r$. In one example, the similarity between the fake row data samples $x_r$ and the real data samples $X_r$ can be represented by V(D,G) in the Equation 5 above. Moreover, (forward propagation as well as) the back propagation in the example 300P through the NNs may aim to learn the underlying relationship(s) between row data and column data and to maximize mutual information, which can be dependent on $\lambda L_I(G,Q)$ in the equation above. For example, the back propagation can modify the weights (e.g., $w_n$), which can be utilized to represent $\lambda L_I(G,Q)$. Weights for rows will affect weights for columns, and vice versa. In an example, in the real world, during back propagation, d' can affect weights in both the row and column dimensions.

FIG. 3Q illustrates an example 300Q, which includes the row clustering distribution model 208A (e.g., $Q_r$), the auxiliary clustering distribution model 210 (e.g., $Q_{co}$), and the row discriminator 206A (e.g., "$D_r$"). For example, the row discriminator 206A (e.g., "$D_r$") may determine whether the fake row data samples $x_r$ are sufficiently similar to the real row data samples $X_r$ (e.g., True or False). In particular embodiments, if the fake row data samples $x_r$ are sufficiently similar to the real row data samples are sufficiently similar (e.g., True), then training may be determined to be complete (e.g., convergence) for one or more real row data samples $X_r$. Thus, once the training is completed, then the row data output vector $c_r'$, the column data output vector $c_c'$, and the one or more co-cluster labels d' may be generated. In particular embodiments, the training may be then iteratively repeated for all fake row data samples $x_r$ (e.g., including for all values for $c_r$, d, and $z_r$). The same is then repeated for all fake column data samples $x_c$ (e.g., including for all values for $c_c$, d, and $z_c$). In some embodiments, the disclosed technology performs forgoing computations concurrently (e.g., all rows and columns computed at the same time), in parallel, and/or simultaneously. However, it should be appreciated that other approaches are possible.

Figure 3R:
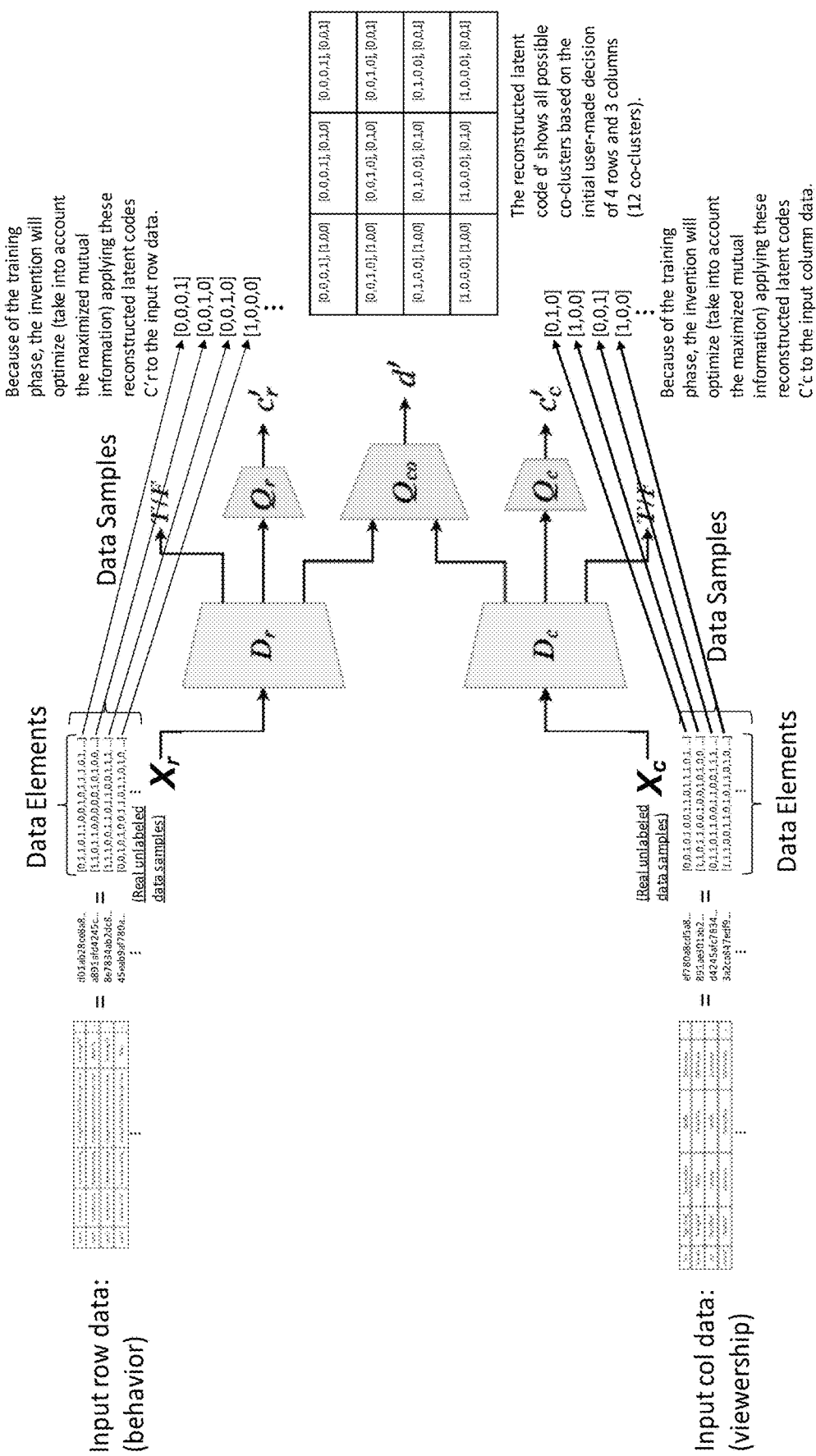
Figure 3S:
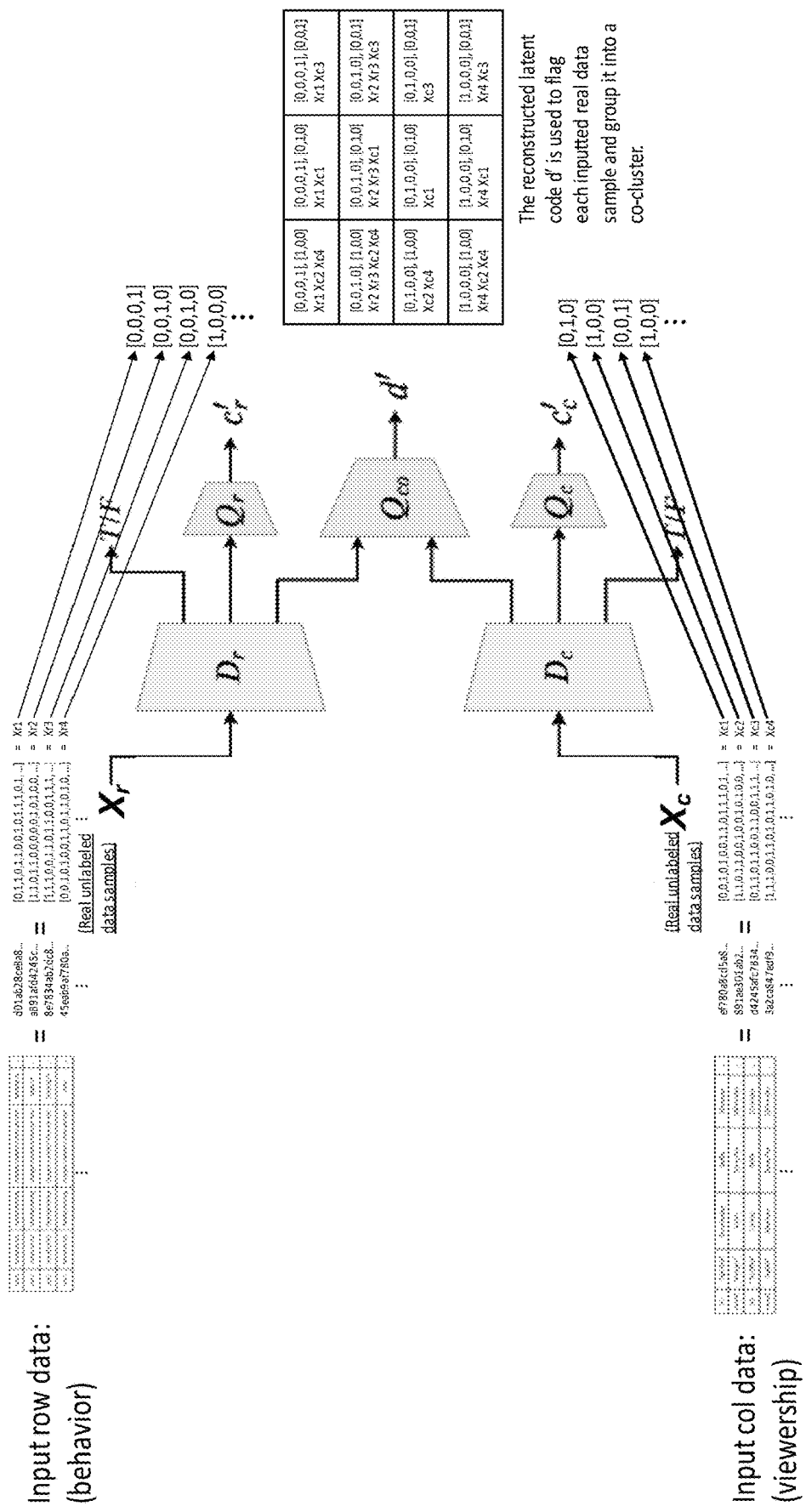
Figure 3T:
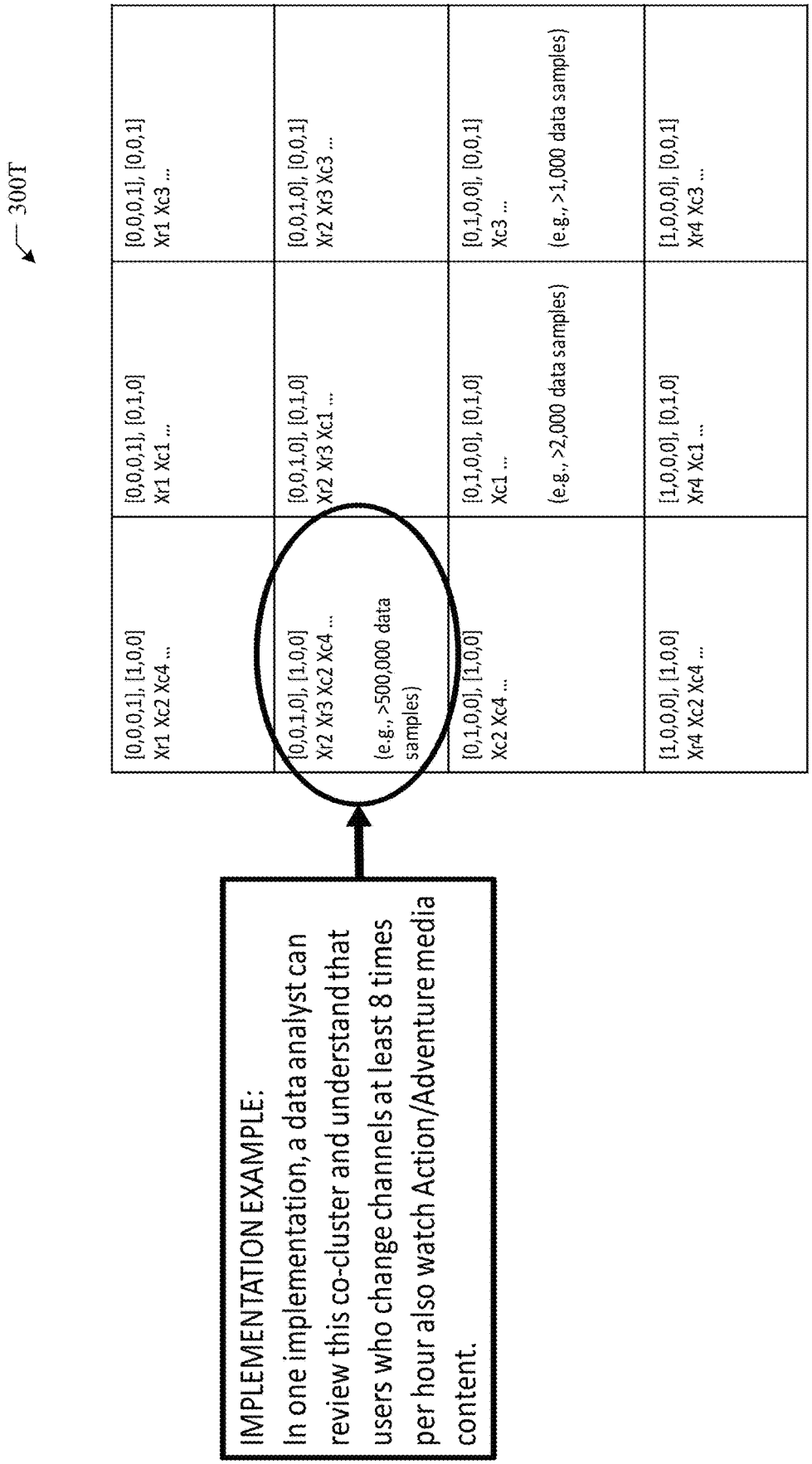

FIGS. 3R-3U illustrate example inferring phases and additional running examples of utilizing a CI-GAN (as described above with respect to FIGS. 2A and 2B) for efficient data co-clustering, in accordance with the presently disclosed embodiments. FIG. 3R illustrates a first inferring phase example 300R. Specifically, based on the training phase, the disclosed technology can optimize (e.g., take into account the maximized mutual information) applying the reconstructed latent codes $c_r'$ to the input row data and applying the reconstructed latent codes $c_r'$ to the input column data. Moreover, based on the training phase, the disclosed technology can generate reconstructed latent codes d' which show all possible co-clusters based on the initial user-made (e.g., data analyst) decision of 4 rows and 3 columns (e.g., 12 co-clusters). FIG. 3S illustrates an inferring phase example 300S. The inferring phase example 300S illustrates that the reconstructed latent code d' is used to flag each inputted real data sample and group it into a co-cluster. The example table in 300S represents the completed co-clustering. For instance, in the real world, there may be vastly more data samples. Each co-cluster may include data samples that are similar or related to one another. In this way, the user (e.g., data analyst) may then review the co-clusters to find hidden or non-obvious meanings or relationships between two domains (e.g., behavior and viewership). For example, FIG. 3T illustrates a completed co-clustering example 300T. For example, the present techniques may provide personalized recommendations, as well as personalized advertisements, in that, for example, a developer may review the co-clustering example 300U and ascertain that users who change channels at least 8 times per hour also watch Action/Adventure media content, for example.

Figure 4:
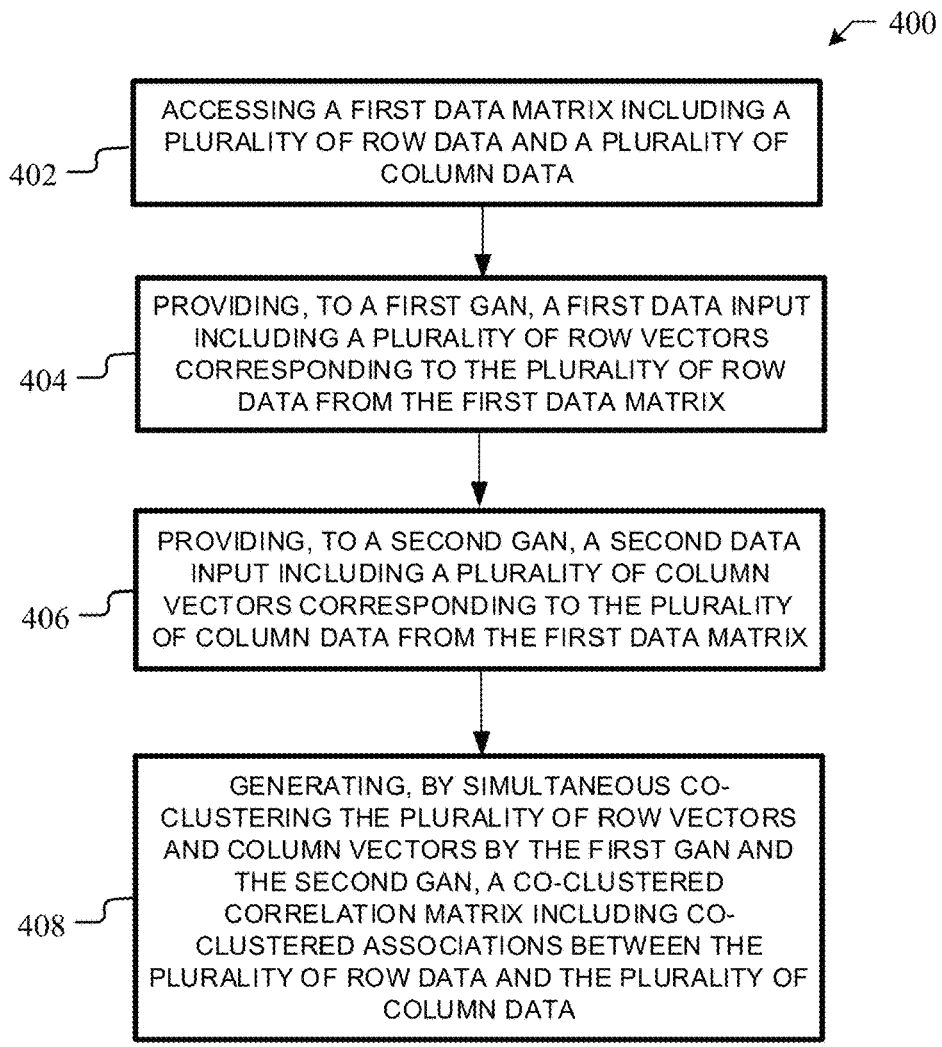
FIG. 4 illustrates a flow diagram of a method of providing a co-informatic generative adversarial network (CI-GAN) for data co-clustering.

FIG. 4 illustrates a flow diagram of a method 400 for providing a co-informatic generative adversarial networks (CI-GAN) for performing data co-clustering, in accordance with the presently disclosed embodiments. The method 400 may be performed utilizing one or more processing devices (e.g., programming analytics system 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 400 may begin block 402 with the one or more processing devices (e.g., programming analytics system 102) accessing a first data matrix including a plurality of row data and a plurality of column data. In particular embodiments, the programming analytics system 102 may receive a data matrix of data, which may include, for example, user behavioral data as the plurality of row data and user content viewing data as the plurality of column data, video data as the plurality of row data and video-caption data as the plurality of column data, biological genetic data as the plurality of row data and biological condition data as the plurality of column data, movie data as the plurality of row data and music data as the plurality of column data, image data as the plurality of row data and audible data as the plurality of column data.

The method 400 may then continue at block 404 with the one or more processing devices (e.g., programming analytics system 102) providing, to a first generative adversarial network (GAN), a first data input including a plurality of row vectors corresponding to the plurality of row data from the first data matrix. The method 400 may then continue at block 406 with the one or more processing devices (e.g., programming analytics system 102) providing, to a second GAN, a second data input including a plurality of column vectors corresponding to the plurality of column data from the first data matrix. In particular embodiments, the first GAN and the second GAN may be part of a co-informatic generative adversarial network (CI-GAN) combiner model architecture, in which the CI-GAN combiner model architecture may further include a distribution function configured to reconstruct one or more co-cluster labels provided to the first GAN and the second GAN as a third data input. In particular embodiments, in conjunction or in the alternative, the first GAN and the second GAN may be part of a co-informatic generative adversarial network (CI-GAN) autoencoder model architecture, in which the CI-GAN autoencoder model architecture may further include a distribution function configured to reconstruct the plurality of row data and the plurality of column data based on a plurality of output row data generated by the first GAN and a plurality of output column data generated by the second GAN.

The method 400 may then conclude at block 408 with the one or more processing devices (e.g., programming analytics system 102) generating, by simultaneous co-clustering the plurality of row vectors and the plurality of column vectors by the first GAN and the second GAN, a co-clustered correlation matrix based at least in part on the plurality of row vectors and the plurality of column vectors, in which the co-clustered correlation matrix includes co-clustered associations between the plurality of row data and the plurality of column data of the first data matrix. In particular embodiments, generating, by simultaneous co-clustering the plurality of row vectors and the plurality of column vectors by the first GAN and the second GAN, the co-clustered correlation matrix may include determining one or more underlying interrelations between the plurality of row data and the plurality of column data of the first data matrix based at least in part on a mutual information cost function. For example, the embodiment of the CI-GAN combiner model architecture, in particular, may determine the one or more underlying interrelations between the plurality of row data and the plurality of column data of the first data matrix based at least in part on the mutual information cost function.

In particular embodiments, generating, by simultaneous co-clustering the plurality of row vectors and the plurality of column vectors by the first GAN and the second GAN, the co-clustered correlation matrix may also include determining a lower bound by which to define an objective function corresponding to a mutual information between the plurality of row data and the plurality of column data of the first data matrix and the co-clustered associations. For example, the embodiment of the CI-GAN autoencoder model architecture, in particular, may determine the lower bound by which to define the objective function corresponding to the mutual information between the plurality of row data and the plurality of column data of the first data matrix and the co-clustered associations. In particular embodiments, generating, by simultaneous co-clustering the plurality of row vectors and the plurality of column vectors by the first GAN and the second GAN, the co-clustered correlation matrix may further include determining one or more disentangled representations of the plurality of row data and the plurality of column data individually, or determining the one or more disentangled representations of the plurality of row data and the plurality of column data concurrently. In particular embodiments, determining the one or more disentangled representations of the plurality of row data and the plurality of column data concurrently may include determining a joint disentangled representation utilized to decipher interplay data structures in the co-clustered correlation matrix.

Indeed, the present embodiments provide a CI-GAN for efficient data co-clustering. Specifically, as the data clustering of row data and column data are achieved independently by a first GAN and a second GAN, the presently disclosed CI-GAN may thus allow the maximization of the mutual information (e.g., I indicating a measurement of how much one random variable may suggest about another random variable) between the input row data and column data and the co-cluster associations in several different manners. In this way, the present CI-GAN for efficient data co-clustering augmented with a mutual information objective may be well suited for collectively learning dual data representations across various technical applications. Indeed, the present techniques may improve programming personalization/recommendation, ad-targeting (e.g., displaying relevant ads to particular users), content demand prediction (e.g., predicting what content particular users want to watch), personalized device settings (e.g., if particular users watch nature shows, then adjust device color settings), among various other applications.

Figure 5:
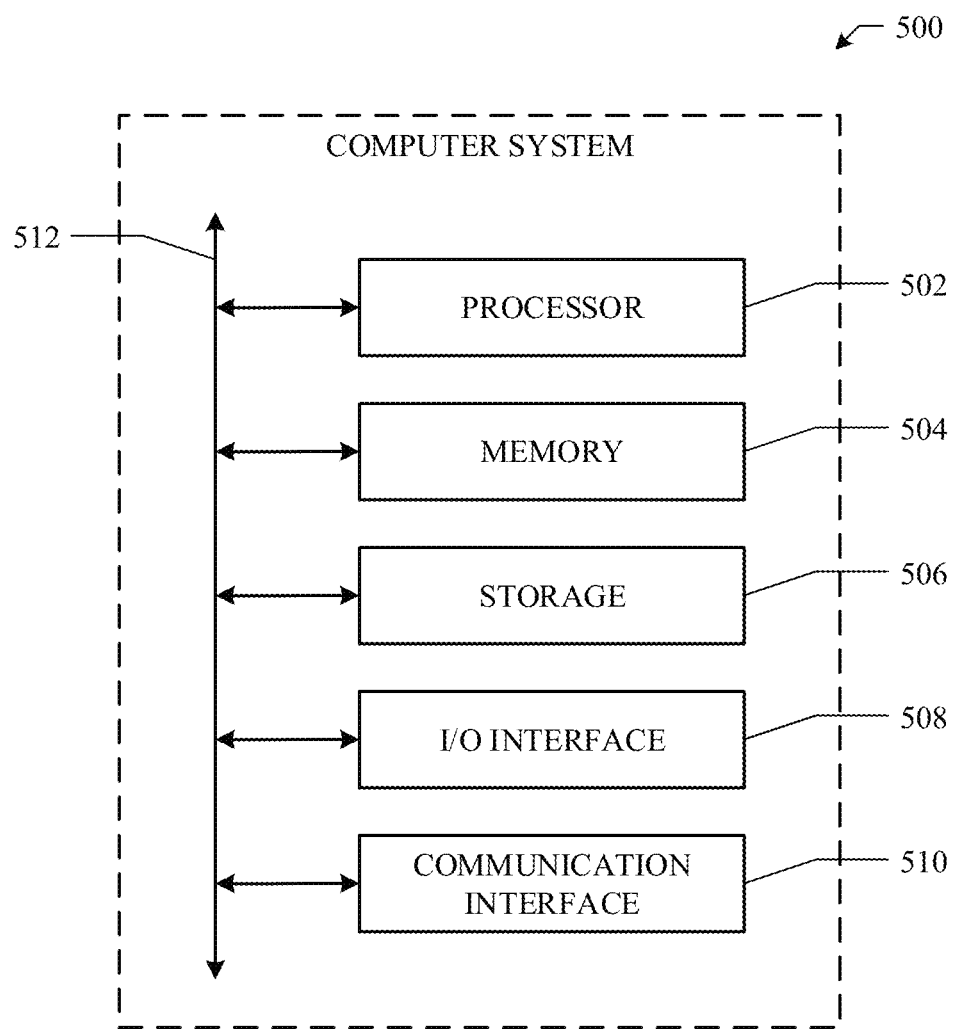
FIG. 5 illustrates an example computer system.

FIG. 5 illustrates an example computer system 500 that may be utilized to provide a co-informatic generative adversarial network (CI-GAN) for data co-clustering, in accordance with the presently disclosed embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks.

Where appropriate, one or more computer systems 500 may perform without substantial spatial or temporal limitation one or more steps of one or more methods described or illustrated herein. As an example, and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (IO) interface 508, a communication interface 810, and a bus 512. Although this disclosure describes and illustrates a particular computer system having a particular number of particular components in a particular arrangement, this disclosure contemplates any suitable computer system having any suitable number of any suitable components in any suitable arrangement. In particular embodiments, processor 502 includes hardware for executing instructions, such as those making up a computer program. As an example, and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example, and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502.

Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 802. Although this disclosure describes and illustrates a particular processor, this disclosure contemplates any suitable processor.

In particular embodiments, memory 504 includes main memory for storing instructions for processor 502 to execute or data for processor 502 to operate on. As an example, and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere).

One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memory devices 504, where appropriate. Although this disclosure describes and illustrates particular memory, this disclosure contemplates any suitable memory.

In particular embodiments, storage 506 includes mass storage for data or instructions. As an example, and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 506 for them. Where appropriate, I/O interface 508 may include one or more device or software drivers enabling processor 502 to drive one or more of these I/O devices. I/O interface 508 may include one or more I/O interfaces 506, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 500 and one or more other computer systems 500 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it.

As an example, and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 512 includes hardware, software, or both coupling components of computer system 500 to each other. As an example, and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 6:
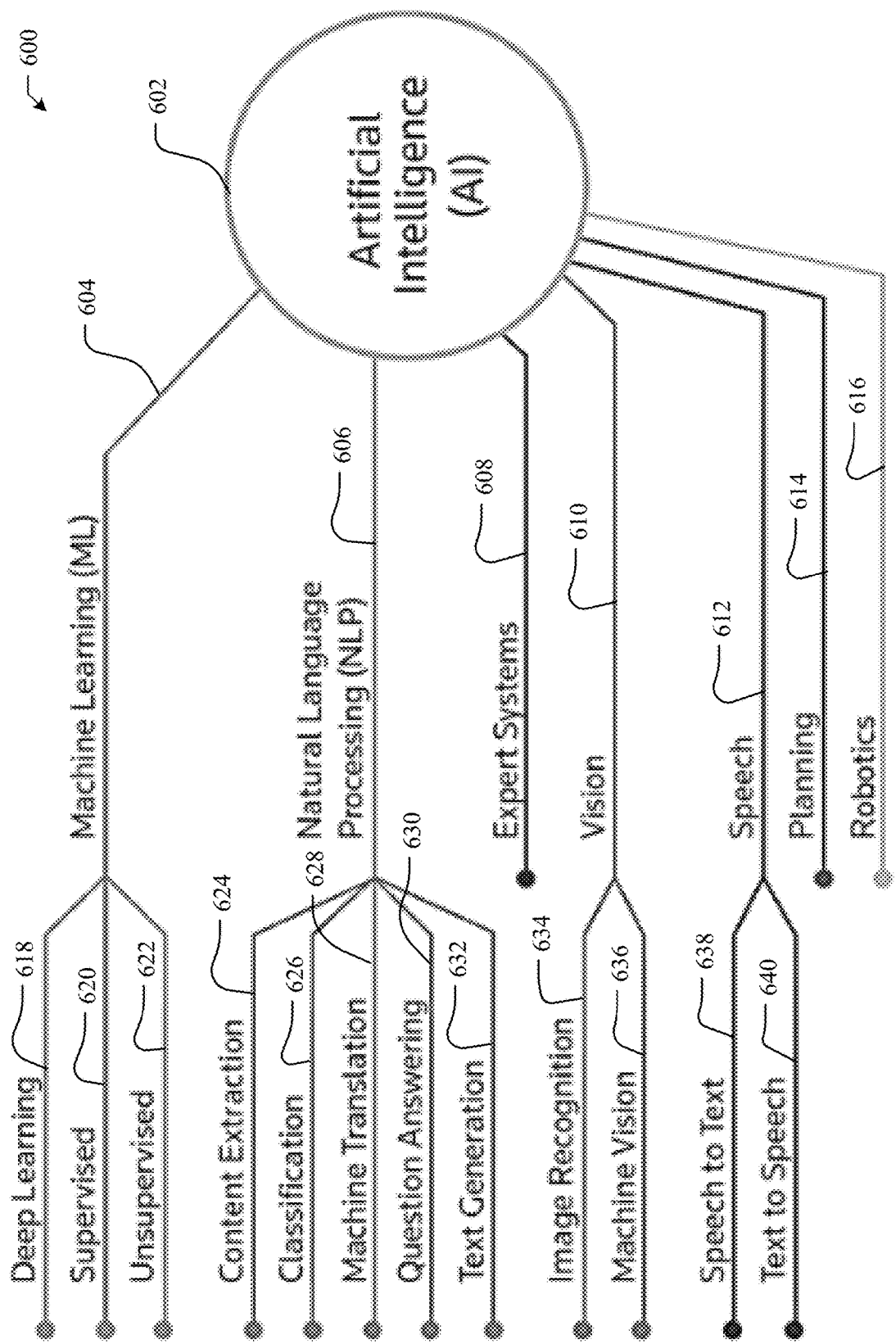
FIG. 6 illustrates a diagram of an example artificial intelligence (AI) architecture.

FIG. 6 illustrates a diagram 600 of an example artificial intelligence (AI) architecture 602 that may be utilized to provide a co-informatic generative adversarial network (CI-GAN) for data co-clustering, in accordance with the presently disclosed embodiments. In particular embodiments, the AI architecture 602 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 6, the A architecture 602 may include machine leaning (ML) algorithms and functions 604, natural language processing (NLP) algorithms and functions 606, expert systems 608, computer-based vision algorithms and functions 610, speech recognition algorithms and functions 612, planning algorithms and functions 614, and robotics algorithms and functions 616. In particular embodiments, the ML algorithms and functions 604 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 604 may include deep learning algorithms 618, supervised learning algorithms 620, and unsupervised learning algorithms 622.

In particular embodiments, the deep learning algorithms 618 may include any artificial neural networks (ANNs) that may be utilized to learn deep levels of representations and abstractions from large amounts of data. For example, the deep learning algorithms 618 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 620 may include any algorithms that may be utilized to apply, for example, what has been learned in the past to new data using labeled examples for predicting future events. For example, starting from the analysis of a known training dataset, the supervised learning algorithms 620 may produce an inferred function to make predictions about the output values. The supervised learning algorithms 620 can also compare its output with the correct and intended output and find errors in order to modify the supervised learning algorithms 620 accordingly. On the other hand, the unsupervised learning algorithms 622 may include any algorithms that may applied, for example, when the data used to train the unsupervised learning algorithms 622 are neither classified nor labeled. For example, the unsupervised learning algorithms 622 may study and analyze how systems may infer a function to describe a hidden structure from unlabeled data.

In particular embodiments, the NLP algorithms and functions 606 may include any algorithms or functions that may be suitable for automatically manipulating natural language, such as speech and/or text. For example, in some embodiments, the NLP algorithms and functions 606 may include content extraction algorithms or functions 624, classification algorithms or functions 626, machine translation algorithms or functions 628, question answering (QA) algorithms or functions 630, and text generation algorithms or functions 632. In particular embodiments, the content extraction algorithms or functions 624 may include a means for extracting text or images from electronic documents (e.g., webpages, text editor documents, and so forth) to be utilized, for example, in other applications.

In particular embodiments, the classification algorithms or functions 626 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 628 may include any algorithms or functions that may be suitable for automatically converting source text in one language, for example, into text in another language. The QA algorithms or functions 630 may include any algorithms or functions that may be suitable for automatically answering questions posed by humans in, for example, a natural language, such as that performed by voice-controlled personal assistant devices. The text generation algorithms or functions 632 may include any algorithms or functions that may be suitable for automatically generating natural language texts.

In particular embodiments, the expert systems 608 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 610 may include any algorithms or functions that may be suitable for automatically extracting information from images (e.g., photo images, video images). For example, the computer-based vision algorithms and functions 610 may include image recognition algorithms 634 and machine vision algorithms 636. The image recognition algorithms 634 may include any algorithms that may be suitable for automatically identifying and/or classifying objects, places, people, and so forth that may be included in, for example, one or more image frames or other displayed data. The machine vision algorithms 636 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 612 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 614 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 616 may include any algorithms, functions, or systems that may enable one or more devices to replicate human behavior through, for example, motions, gestures, performance tasks, decision-making, emotions, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    accessing a first data matrix comprising a plurality of row data and a plurality of column data;
    providing, to a first generative adversarial network (GAN), a first data input comprising a plurality of row vectors corresponding to the plurality of row data from the first data matrix;
    providing, to a second GAN, a second data input comprising a plurality of column vectors corresponding to the plurality of column data from the first data matrix; and
    generating a trained a neural-network row generator of the first GAN by, for each of the plurality of row vectors:
        generating, by the neural-network row generator of the first GAN, fake row data;
        classifying, by a row discriminator of the first GAN, and based on real row-data input, each fake row data as real or fake;
        when all fake row data is not classified as real by the row discriminator of the first GAN, then updating one or more weights of the neural-network row generator through backwards propagation; and
        when all fake row data is classified as real by the row discriminator of the first GAN, then outputting a set of latent row data based on the real row data and the fake row data generated by the trained neural-network row generator;
    generating a trained a neural-network column generator of the second GAN by, for each of the plurality of column vectors:
        generating, by the neural-network column generator of the second GAN, fake column data;
        classifying, by a column discriminator of the second GAN, and based on real column-data input, each fake column data as real or fake;
        when all fake column data is not classified as real by the column discriminator of the second GAN, then updating one or more weights of the neural-network column generator through backwards propagation; and
        when all fake column data is classified as real by the column discriminator of the second GAN, then outputting a set of latent column data based on the real column data and the fake column data generated by the trained neural-network column generator; and
    generating, by simultaneously co-clustering the plurality of row vectors and the plurality of column vectors by the first GAN and the second GAN, a co-clustered correlation matrix based at least in part on the plurality of row vectors, the plurality of column vectors, the latent row data, and the latent column data, wherein the co-clustered correlation matrix comprises co-clustered associations between the plurality of row data and the plurality of column data of the first data matrix.

2. The method of claim 1, wherein the first GAN and the second GAN are part of a co-informatic generative adversarial network (CI-GAN) combiner model architecture, wherein the CI-GAN combiner model architecture further comprises a distribution function configured to reconstruct one or more co-cluster labels provided to the first GAN and the second GAN as a third data input.

3. The method of claim 1, wherein the first GAN and the second GAN are part of a co-informatic generative adversarial network (CI-GAN) autoencoder model architecture, wherein the CI-GAN autoencoder model architecture further comprises a distribution function configured to reconstruct the plurality of row data and the plurality of column data based on a plurality of output row data generated by the first GAN and a plurality of output column data generated by the second GAN.

4. The method of claim 1, wherein generating, by simultaneous co-clustering the plurality of row vectors and the plurality of column vectors by the first GAN and the second GAN, the co-clustered correlation matrix comprises:
    determining one or more underlying interrelations between the plurality of row data and the plurality of column data of the first data matrix based at least in part on a mutual information cost function.

5. The method of claim 1, wherein generating, by simultaneous co-clustering the plurality of row vectors and the plurality of column vectors by the first GAN and the second GAN, the co-clustered correlation matrix comprises:
    determining a lower bound by which to define an objective function corresponding to a mutual information between the plurality of row data and the plurality of column data of the first data matrix and the co-clustered associations.

6. The method of claim 1, wherein generating, by simultaneous co-clustering the plurality of row vectors and the plurality of column vectors by the first GAN and the second GAN, the co-clustered correlation matrix comprises:
    maximizing a mutual information between the plurality of row data and the plurality of column data of the first data matrix and the co-clustered associations.

7. The method of claim 1, wherein generating, by simultaneous co-clustering the plurality of row vectors and the plurality of column vectors by the first GAN and the second GAN, the co-clustered correlation matrix comprises:
    determining one or more disentangled representations of the plurality of row data and the plurality of column data individually.

8. The method of claim 1, wherein generating, by simultaneous co-clustering the plurality of row vectors and the plurality of column vectors by the first GAN and the second GAN, the co-clustered correlation matrix comprises:
    determining one or more disentangled representations of the plurality of row data and the plurality of column data concurrently.

9. The method of claim 8, wherein determining the one or more disentangled representations of the plurality of row data and the plurality of column data concurrently comprises:
    determining a joint disentangled representation utilized to decipher interplay data structures in the co-clustered correlation matrix.

10. The method of claim 1, wherein the first data matrix comprises one or more of:
    user behavioral data as the plurality of row data and user content viewing data as the plurality of column data;
    video data as the plurality of row data and video-caption data as the plurality of column data;
    biological genetic data as the plurality of row data and biological condition data as the plurality of column data;

movie data as the plurality of row data and music data as the plurality of column data; or image data as the plurality of row data and audible data as the plurality of column data.

11. A system comprising: one or more non-transitory computer-readable storage media including instructions; and one or more processors coupled to the storage media, the one or more processors configured to execute the instructions to:

access a first data matrix comprising a plurality of row data and a plurality of column data;

provide, to a first generative adversarial network (GAN), a first data input comprising a plurality of row vectors corresponding to the plurality of row data from the first data matrix;

provide, to a second GAN, a second data input comprising a plurality of column vectors corresponding to the plurality of column data from the first data matrix; and generate a trained a neural-network row generator of the first GAN by, for each of the plurality of row vectors:

generate, by the neural-network row generator of the first GAN, fake row data;

classify, by a row discriminator of the first GAN, and based on real row-data input, each fake row data as real or fake;

when all fake row data is not classified as real by the row discriminator of the first GAN, then update one or more weights of the neural-network row generator through backwards propagation; and when all fake row data is classified as real by the row discriminator of the first GAN, then output a set of latent row data based on the real row data and the fake row data generated by the trained neural-network row generator;

generate a trained a neural-network column generator of the second GAN by, for each of the plurality of column vectors:

generate, by the neural-network column generator of the second GAN, fake column data;

classify, by a column discriminator of the second GAN, and based on real column-data input, each fake column data as real or fake;

when all fake column data is not classified as real by the column discriminator of the second GAN, then update one or more weights of the neural-network column generator through backwards propagation; and when all fake column data is classified as real by the column discriminator of the second GAN, then output a set of latent column data based on the real column data and the fake column data generated by the trained neural-network column generator;

generate, by simultaneously co-clustering the plurality of row vectors and the plurality of column vectors by the first GAN and the second GAN, a co-clustered correlation matrix based at least in part on the plurality of row vectors, the plurality of column vectors, the latent row data, and the latent column data, wherein the co-clustered correlation matrix comprises co-clustered associations between the plurality of row data and the plurality of column data of the first data matrix.

12. The system of claim 11, wherein the first GAN and the second GAN are part of a co-informatic generative adversarial network (CI-GAN) combiner model architecture, wherein the CI-GAN combiner model architecture further comprises a distribution function configured to reconstruct one or more co-cluster labels provided to the first GAN and the second GAN as a third data input.

13. The system of claim 11, wherein the first GAN and the second GAN are part of a co-informatic generative adversarial network (CI-GAN) autoencoder model architecture, wherein the CI-GAN autoencoder model architecture further comprises a distribution function configured to reconstruct the plurality of row data and the plurality of column data based on a plurality of output row data generated by the first GAN and a plurality of output column data generated by the second GAN.

14. The system of claim 11, wherein the instructions to generate, by simultaneous co-clustering the plurality of row vectors and the plurality of column vectors by the first GAN and the second GAN, the co-clustered correlation matrix comprise instructions to:

determine one or more underlying interrelations between the plurality of row data and the plurality of column data of the first data matrix based at least in part on a mutual information cost function.

15. The system of claim 11, wherein the instructions to generate, by simultaneous co-clustering the plurality of row vectors and the plurality of column vectors by the first GAN and the second GAN, the co-clustered correlation matrix comprise instructions to:

determine a lower bound by which to define an objective function corresponding to a mutual information between the plurality of row data and the plurality of column data of the first data matrix and the co-clustered associations.

16. The system of claim 11, wherein the instructions to generate, by simultaneous co-clustering the plurality of row vectors and the plurality of column vectors by the first GAN and the second GAN, the co-clustered correlation matrix comprise instructions to:

maximize a mutual information between the plurality of row data and the plurality of column data of the first data matrix and the co-clustered associations.

17. The system of claim 11, wherein the instructions to generate, by simultaneous co-clustering the plurality of row vectors and the plurality of column vectors by the first GAN and the second GAN, the co-clustered correlation matrix comprise instructions to:

determine one or more disentangled representations of the plurality of row data and the plurality of column data individually.

18. The system of claim 11, wherein the instructions to generate, by simultaneous co-clustering the plurality of row vectors and the plurality of column vectors by the first GAN and the second GAN, the co-clustered correlation matrix comprise instructions to:

determine one or more disentangled representations of the plurality of row data and the plurality of column data concurrently.

19. The system of claim 18, wherein the instructions to determine the one or more disentangled representations of the plurality of row data and the plurality of column data concurrently comprise instructions to:

determine a joint disentangled representation utilized to decipher interplay data structures in the co-clustered correlation matrix.

20. A non-transitory computer-readable medium comprising instructions that, when executed by one or more processors of a computing system, cause the one or more processors to:

access a first data matrix comprising a plurality of row data and a plurality of column data;

provide, to a first generative adversarial network (GAN), a first data input comprising a plurality of row vectors corresponding to the plurality of row data from the first data matrix;

provide, to a second GAN, a second data input comprising a plurality of column vectors corresponding to the plurality of column data from the first data matrix; and generate a trained a neural-network row generator of the first GAN by, for each of the plurality of row vectors:
- generate, by the neural-network row generator of the first GAN, fake row data;
- classify, by a row discriminator of the first GAN, and based on real row-data input, each fake row data as real or fake;
- when all fake row data is not classified as real by the row discriminator of the first GAN, then update one or more weights of the neural-network row generator through backwards propagation; and
- when all fake row data is classified as real by the row discriminator of the first GAN, then output a set of latent row data based on the real row data and the fake row data generated by the trained neural-network row generator;

generate a trained a neural-network column generator of the second GAN by, for each of the plurality of column vectors:
- generate, by the neural-network column generator of the second GAN, fake column data;
- classify, by a column discriminator of the second GAN, and based on real column-data input, each fake column data as real or fake;
- when all fake column data is not classified as real by the column discriminator of the second GAN, then update one or more weights of the neural-network column generator through backwards propagation; and when all fake column data is classified as real by the column discriminator of the second GAN, then output a set of latent column data based on the real column data and the fake column data generated by the trained neural-network column generator;

generate, by simultaneously co-clustering the plurality of row vectors and the plurality of column vectors by the first GAN and the second GAN, a co-clustered correlation matrix based at least in part on the plurality of row vectors, the plurality of column vectors, the latent row data, and the latent column data, wherein the co-clustered correlation matrix comprises co-clustered associations between the plurality of row data and the plurality of column data of the first data matrix.

\* \* \* \* \*